(12) United States Patent
Wemple et al.

(10) Patent No.: US 6,719,104 B1
(45) Date of Patent: Apr. 13, 2004

(54) COMPOSITE CALIPER FOR A DISC BRAKE ASSEMBLY AND METHOD FOR PRODUCING SAME

(75) Inventors: Jonathan Wemple, Royal Oak, MI (US); Perry Jenkins, Lake Orion, MI (US); Harry A. Hunnicutt, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 89 days.

(21) Appl. No.: 10/034,979

(22) Filed: Dec. 28, 2001

(51) Int. Cl.[7] ............................................. F16D 65/00
(52) U.S. Cl. ...................................... 188/73.1; 188/370
(58) Field of Search ........................ 164/97, 108, 109, 164/110; 188/71.1, 73.31, 370

(56) References Cited

U.S. PATENT DOCUMENTS

| 4,705,093 | A | * | 11/1987 | Ogino ........................ 164/97 |
| 5,234,080 | A | * | 8/1993 | Pantale ...................... 188/71.1 |
| 5,433,300 | A | * | 7/1995 | Barlow et al. ............. 188/73.1 |
| 5,472,068 | A | * | 12/1995 | Weiler et al. ............ 188/73.44 |
| 5,887,684 | A | * | 3/1999 | Doll et al. .................. 188/71.1 |

FOREIGN PATENT DOCUMENTS

| JP | 61-293650 | * | 12/1986 |
| JP | 61-294228 | * | 12/1986 |
| JP | 61-294229 | * | 12/1986 |
| JP | 62-13832 | * | 1/1987 |

* cited by examiner

*Primary Examiner*—Christopher P. Schwartz
(74) *Attorney, Agent, or Firm*—MacMillan, Sobanski & Todd, LLC

(57) ABSTRACT

The invention relates to a composite brake caliper and method for producing the same. The method for producing the composite brake caliper comprises the steps of: (a) providing a molding apparatus having at least a pair of mold sections, at least one of the pair of mold sections including at least one projection extending from a surface thereof; (b) providing at least one reinforced preform formed from at least a first material, the preform having at least one opening formed at least partially therein; (d) positioning the preform in the molding apparatus with the projection of the mold section extending into the opening of the preform so as to orient the preform in a predetermined position within the molding apparatus; and (e) casting a caliper body formed from a second material in situ therewith to produce the composite brake caliper.

52 Claims, 14 Drawing Sheets

COMPOSITE CALIPER FOR A DISC BRAKE ASSEMBLY AND METHOD FOR PRODUCING SAME

BACKGROUND OF THE INVENTION

This invention relates in general to vehicle disc brake assemblies and in particular to an improved structure for a composite caliper adapted for use in such a vehicle disc brake assembly and method for producing such a brake caliper.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. The rotor includes a pair of opposed friction plates which are selectively engaged by portions of a caliper assembly. The caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

In order to reduce the weight of the disc brake assembly, it is known to reduce the weight of the caliper assembly of the disc brake assembly. Specifically, it is known to reduce the weight of an associated caliper of the caliper assembly. However, during braking, the caliper must be sufficiently stiff to withstand the braking forces which are generated. Thus, it would be desirable to provide a reduced weight caliper structure which was simple and economical, yet sufficiently stiff to withstand braking forces.

SUMMARY OF THE INVENTION

This invention relates to an improved structure for a composite brake caliper adapted for use in a vehicle disc brake assembly and method for producing such a composite brake caliper. The method for producing the composite brake caliper comprises the steps of: (a) providing a molding apparatus having at least a pair of mold sections, at least one of the pair of mold sections including at least one projection extending from a surface thereof; (b) providing at least one reinforced preform formed from at least a first material, the preform having at least one opening formed at least partially therein; (d) positioning the preform in the molding apparatus with the projection of the mold section extending into the opening of the preform so as to orient the preform in a predetermined position within the molding apparatus; and (e) casting a caliper body formed from a second material in situ therewith to produce the composite brake caliper.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
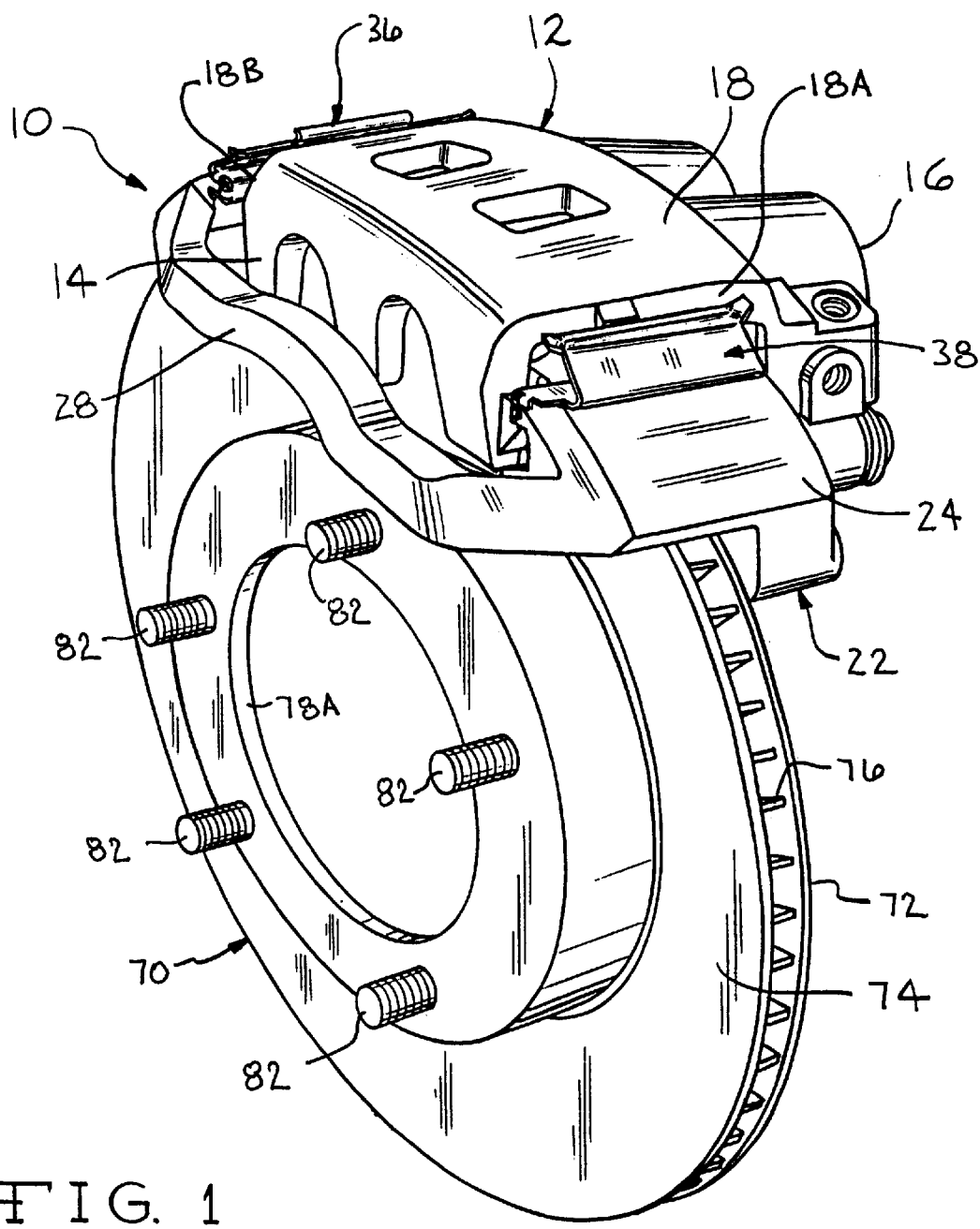
FIG. 1 is a perspective view of a portion of a prior art vehicle disc brake assembly.
Figure 2:
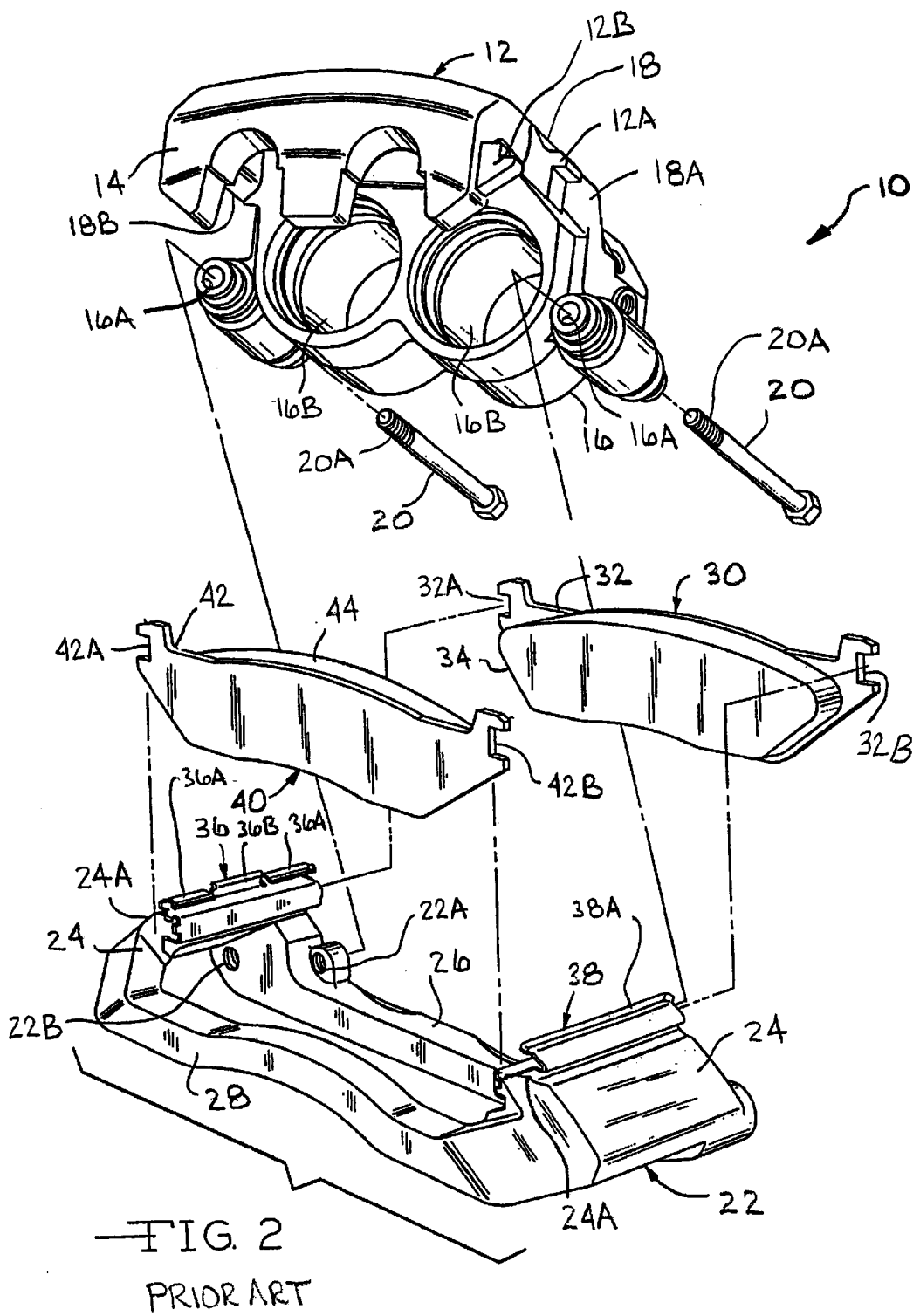
FIG. 2 is an exploded perspective view of a portion of the prior art disc brake assembly illustrated in FIG. 1.
Figure 3:
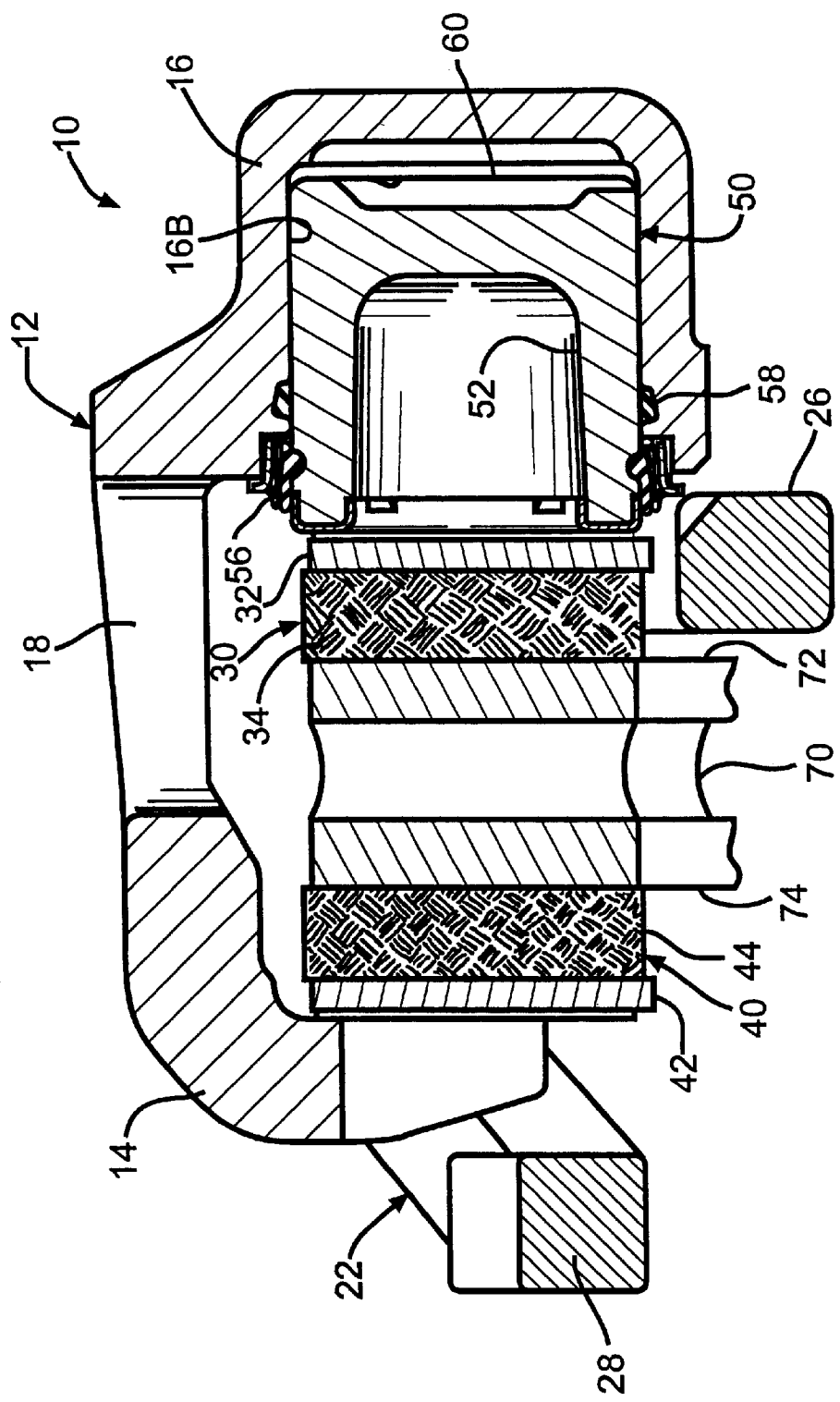
FIG. 3 is a sectional elevational view of a portion of the prior art disc brake assembly illustrated in FIG. 1.

Referring now to the drawings, there is illustrated in FIGS. 1 through 3 a portion of a prior art vehicle disc brake assembly, indicated generally at 10. The general structure and operation of the prior art disc brake assembly 10 is conventional in the art. Thus, only those portions of the prior art disc brake assembly 10 which are necessary for a full understanding of this invention will be explained and illustrated. It should be noted that while the invention is described for use with the particular prior art disc brake structure shown in the drawings, the invention can be used with other kinds of disc brake assembly structures.

The illustrated prior art disc brake assembly 10 includes a generally C-shaped caliper, indicated generally at 12. The caliper 12 includes an outboard leg portion 14 and inboard leg portion 16 which are interconnected by an intermediate bridge portion 18. The caliper 12 is slidably supported on a pair of pins 20 secured to an anchor plate, indicated generally at 22. The pins 20 extend through respective non-threaded apertures 16A formed through the inboard leg 16 of the caliper 12. The pins 20 have threaded ends 20A which are received in respective threaded apertures 22A (only one of such threaded apertures 22A shown in FIG. 1), formed through the anchor plate 22. The pins 20 permit the caliper 12 to slide in both the outboard direction (toward the left when viewing FIG. 3) and the inboard direction (toward the right when viewing FIG. 3). Such sliding movement of the caliper 12 occurs when the prior art disc brake assembly 10 is actuated, as will be explained below.

A pair of bolts (not shown) having threaded ends extend through associated non-threaded holes formed in a stationary component of the vehicle, such as the steering knuckle (not shown) in a front wheel drive vehicle, and are received in threaded apertures 22B (only one of such apertures 22B shown in FIG. 2), formed through the anchor plate 22 to secure the anchor plate 22 to a stationary vehicle component. In the illustrated prior art disk brake assembly 10, the caliper 12 further includes a pair of lift stops or arms 12A and 12B provided on a side 18A of the bridge portion 18, best shown in FIG. 2, and a single lift stop or arm (not shown) provided on an opposite side 18B thereof.

As best shown in FIG. 2, the illustrated anchor plate 22 includes a pair of outwardly extending arms 24 which are interconnected at inner ends thereof by an inner tie bar 26 and at outer ends thereof by an outer tie bar 28. Each of the arms 24 includes an upstanding guide rails 24A formed thereon. The guide rails 24A extend transverse to the arms 24 and parallel to one another. The guide rails 24A are provided to slidably support an inboard brake shoe, indicated generally at 30, and an outboard brake shoe, indicated generally at 40, respectively.

The inboard brake shoe 30 includes a backing plate 32 and a friction pad 34. The opposed ends of the inboard backing plate 32 have notches 32A and 32B formed therein for supporting the inboard brake shoe 30 on the guide rails 24A of the anchor plate 22. The outboard brake shoe 40 includes a backing plate 42 and a friction pad 44. The opposed ends of the outboard backing plate 42 have notches 42A and 42B formed therein for supporting the outboard brake shoe 40 on the guide rails 24A of the anchor plate 22.

A pair of clip or springs 36 and 38 are disposed on a respective one of the guide rails 24A. The clip 36 includes a pair of outer spring arms 36A which engage and bias the associated ends of the brake shoes 30 and 40 against the anchor plate 22, and a center spring arm 36B which engages and biases the single lift stop of the caliper 12 downwardly against the anchor plate 22. The clip 38 indicates a spring arm 38A which engages both the associated ends of the brake shoes 30 and 40 and the lift stop 12A and 12B of the caliper 12 downwardly against the anchor plate 22. Alternatively, as is known in the art, the inboard brake shoe 30 can be supported on a brake piston of the disc brake assembly 10, while the outboard brake shoe 40 can be supported on the outboard leg portion 14 of the caliper 12.

An actuation means, indicated generally at 50 in FIG. 3, is provided for effecting the operation of the disc brake assembly 10. The illustrated actuation means 50 includes a pair of brake pistons 52 (only one of the pistons 52 shown in FIG. 3), which are slidably disposed in a pair of counterbores or recesses 16B formed in the outboard surface of the inboard leg 16 of the caliper 12. The actuation means 50, shown in this embodiment as being a hydraulic actuation means, in operable to move the pistons 52 in the outboard direction within the recess 16B (toward the left when viewing FIG. 3) when operated. However, other types of actuation means 50, such as for example, electrical and mechanical types, can be used if desired.

The prior art disc brake assembly 10 also includes a dust boot seal 56 and an annular fluid seal 58. The dust boot seal 56 is formed from a flexible material and has a first end which engages an outboard end of the recess 16B. A second end of the dust boot seal 56 engages an annular groove formed in an outer side wall of the associated piston 52. A plurality of flexible convolutions are provided in the dust boot seal 56 between the first and second ends thereof. The dust boot seal 56 is provided to prevent water, dirt, and other contaminants from entering into the recess 16B. The fluid seal 58 is preferably disposed in an annular groove formed in a side wall of the recesses 16B and engages the outer side wall of the associated piston 52. The fluid seal 58 is provided to define a sealed hydraulic actuator chamber 60, within which the pistons 52 are disposed for sliding movement. Also, the fluid seal 58 is designed to function as a "roll back" seal to retract the pistons 52 within the recesses 16B (toward the right when viewing FIG. 3) when a brake pedal of the vehicle is released.

The disc brake assembly 10 further includes a rotor, indicated generally at 70, which is connected to a wheel (not shown) of the vehicle for rotation therewith. The illustrated rotor 70 is ventilated and includes a pair of opposed friction plates 72 and 74 which are spaced apart from one another by a plurality of intermediate ribs or posts 76 in a known manner. The rotor 70 extends radially outwardly between the inboard friction pad 30 and the outboard friction pad 40. The entire rotor 70, including the two friction plates 72 and 74 and the intermediate ribs 76, may be cast as a single piece if desired.

The rotor 70 further includes an inner mounting flange portion 78 connected to the friction plate 74 by a circumferential wall or hat portion 80. The inner mounting flange portion 78 includes a centrally located pilot hole 78A which defines an axis of the rotation for the rotor 70, and a plurality of lug bolt receiving holes (five of such lug bolt receiving holes are shown in FIG. 1), equally spaced circumferentially on the rotor 70 about the pilot hole 78A. A lug bolt 82 extends through each of the lug bolt receiving holes for mounting and securing the rotor 70 to the vehicle wheel for rotation therewith.

When it is desired to actuate the disc brake assembly 10 to slow or stop the rotation of the rotor 70 and the vehicle wheel associated therewith, the driver of the vehicle depresses the brake pedal. In a manner which is well known in the art, the depression of the brake pedal causes pressurized hydraulic fluid to be introduced into the chambers 60. Such pressurized hydraulic fluid urges the associated pistons 52 in the outboard direction (toward the left when viewing FIG. 3) into engagement with the backing plate 32 of the inboard brake shoe 30. As a result, the friction pad 34 of the inboard brake shoe 30 is moved into frictional engagement with the inboard friction plate 72 of the rotor 70.

At the same time, the caliper 12 slides on the pins 20 in the inboard direction (toward the right when viewing FIG. 3) such that the outboard leg 14 thereof moves the friction pad 44 of the outboard brake shoe 40 into frictional engagement with the outboard friction plate 74 of the rotor 70. As a result, the opposed friction plates 72 and 74 of the rotor 70 are frictionally engaged by the friction pads 34 and 44. The structure and operation of the disc brake assembly 10 thus far described is conventional in the art.

Figure 4:
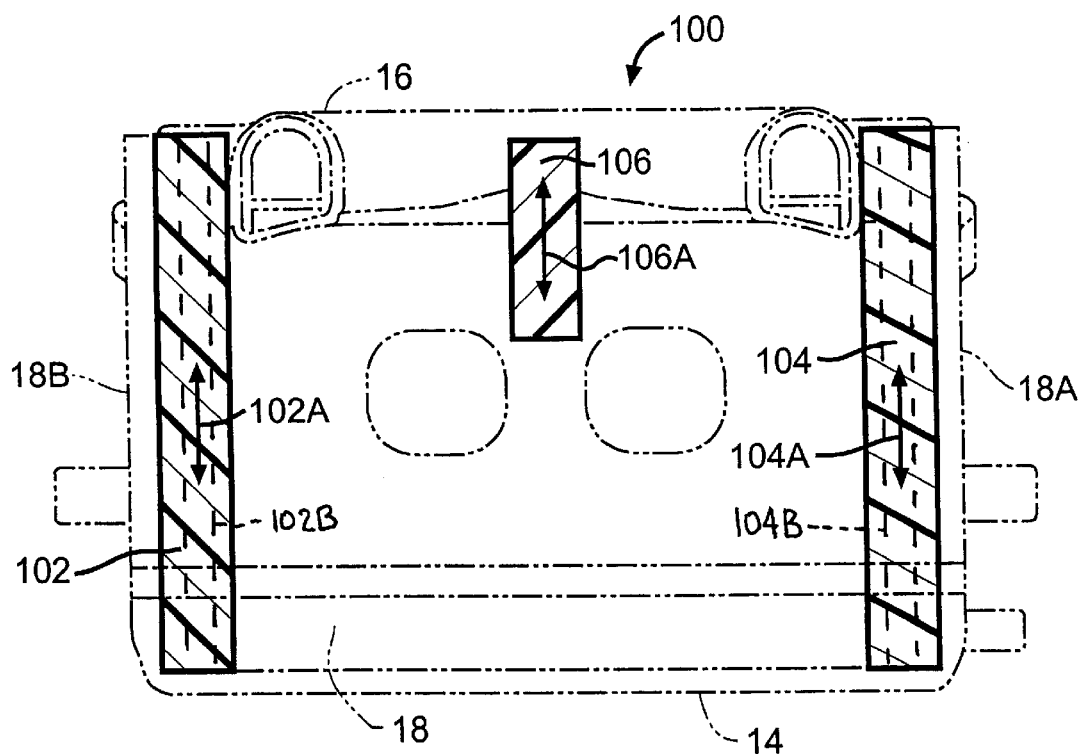
FIG. 4 is a top view of a first embodiment of an improved structure for a caliper in accordance with this invention.
Figure 5:
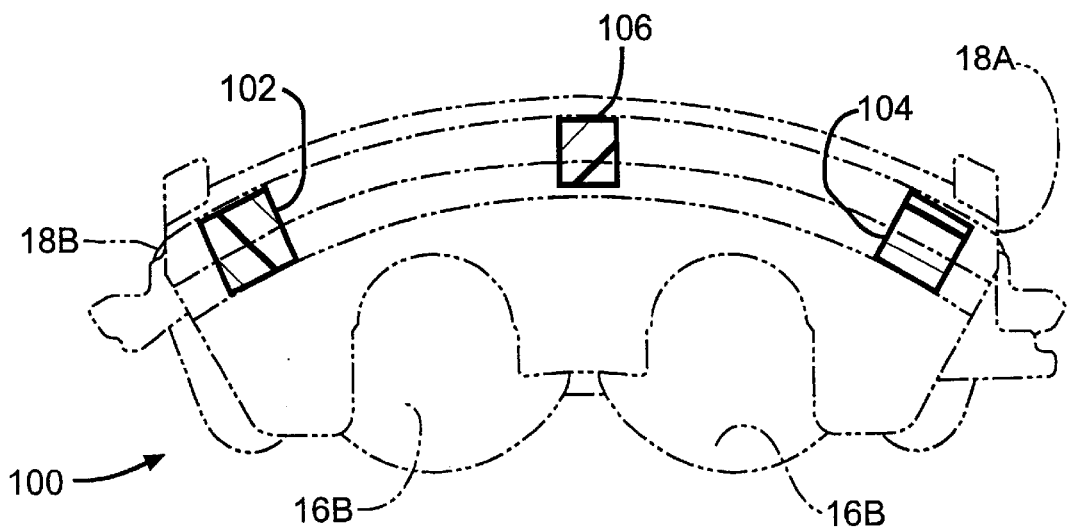
FIG. 5 is a side view of the caliper illustrated in FIG. 4.

Turning now to FIGS. 4 and 5 and using like reference numbers to indicate corresponding parts, there is illustrated a first embodiment of an improved structure for a caliper, indicated generally at 100, in accordance with this invention which can be used in place of the conventional caliper 12 of the prior art disc brake assembly 10 illustrated and described above in connection with FIGS. 1 through 3. Although the caliper 100 of this invention will be described and illustrated in conjunction with the particular prior art vehicle disc brake assembly 10 structure diclosed herein, it will be appreciated that it may be used in conjunction with other kinds of disc brake assembly structures.

The caliper 100 is preferably a fiber reinforced caliper formed from aluminum or alloys thereof and includes an inboard leg portion 16 and an outboard leg portion 14 which are interconnected by an intermediate bridge portion 18. More preferably, the caliper 100 is made from aluminum, such as for example, A354, A356, or A357, and is reinforced with one or more preforms or segments containing individual strands of ceramic fibers. The preforms are preferably formed from chopped alumina oxide fibers and are extruded or otherwise preformed into the predetermined preforms and are selectively disposed in a casting mold and molded integrally in situ therewith the aluminum caliper body during a casting process. The individual strands of the ceramic fibers in the preforms are preferably alumina oxide ($Al_2O_3$) ceramic fibers. One example of suitable ceramic fibers are Nextel® ceramic fibers manufactured by Minnesota Mining and Manufacturing Company (a.k.a. 3M Corporation), of Saint Paul, Minn. Alternatively, the caliper 100 can be formed from other metals, such as nodular iron, or a combination of two different metals, such as for example, an aluminum based metal matrix composite (MMC) containing silicon carbide particulate reinforcement, aluminum oxide fibers, aluminum oxide chopped fibers and aluminum.

As shown in FIGS. 4 and 5, the caliper 100 includes three preforms 102, 104 and 106. The preform 102 has a generally uniform cross-sectional shape and is preferably disposed near the side 18B of the bridge 18 of the caliper 100. In the illustrated embodiment, the preform 102 has a generally square shape; however, the shape of the preform 102 can be of any suitable shape, such as for example, rectangular, circular, and triangular and/or can be uniform or non-uniform.

The preform 102 preferably extends across the entire axial width of the bridge 18 of the caliper 100 extending from the outboard leg 14 to the inboard leg 16. The individual strands of the ceramic fibers 102B (two of such strands 102B shown in FIG. 4 by a dashed line) in the preform 102 are preferably oriented in an axial direction as indicated by the arrow 102A and in parallel relationship with an axis X of the caliper 100.

The preform 104 has a generally uniform cross-sectional shape and is preferably disposed near the side 18A of the bridge 18 of the caliper 100. The preform 104 preferably extends across the entire axial width of the bridge 18 of the caliper 100 extending from the outboard leg 14 to the inboard leg 16. The individual strands of the ceramic fibers 104B (two of such strands 104B shown in FIG. 4 by a dashed line) in the preform 104 are preferably oriented in an axial direction as indicated by the arrow 104A and in parallel relationship with the axis X of the caliper 100.

The preform 106 has a generally uniform cross-sectional shape and is preferably disposed generally intermediate the bores 16B of the caliper 100. The preform 106 extends across a portion of the bridge 18 of the caliper 100 extending from the inboard leg 16 toward the outboard leg 14. The individual strands of the ceramic fibers 106B (two of such strands 106B shown in FIG. 4 by a dashed line) in the preform 106 are preferably oriented in an axial direction as indicated by the arrow 106A and in parallel relationship with the axis X of the caliper 100. Alternatively, the shape, location and/or number of one or more of the preforms 102, 104 and 106 of the caliper 100 can be other than illustrated if so desired.

Figure 6:
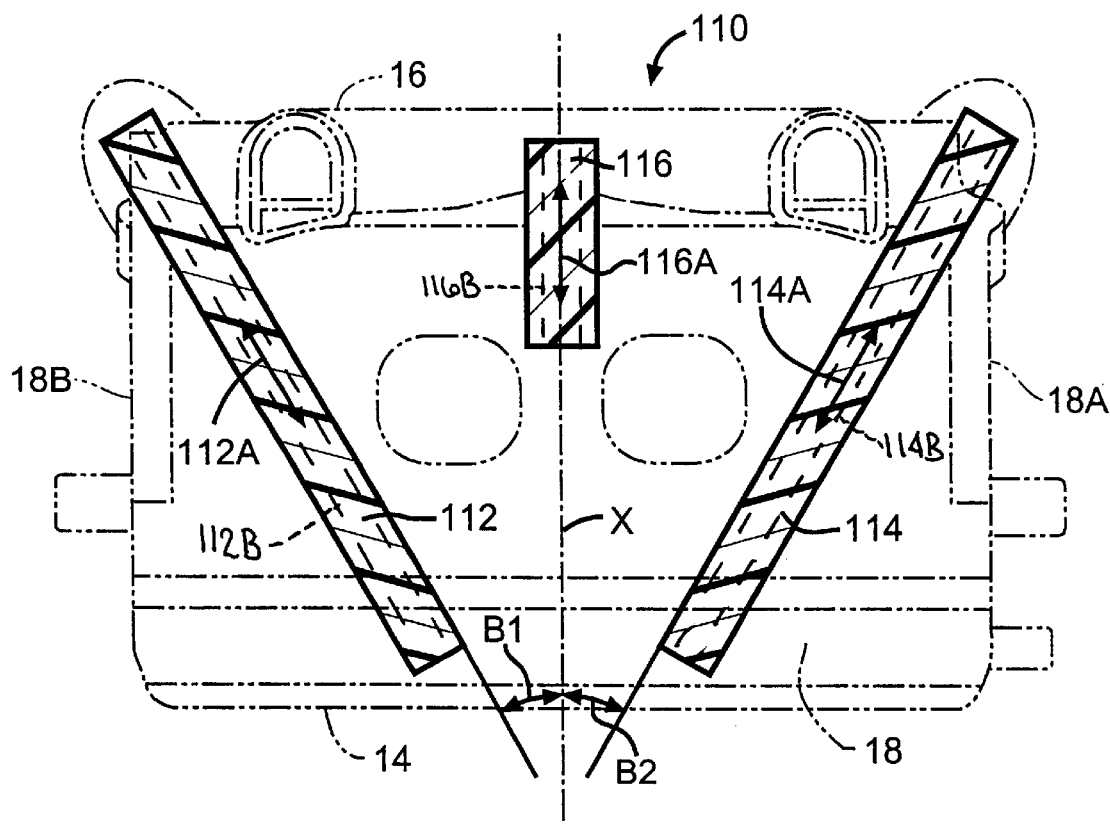
FIG. 6 is a top view of a second embodiment of an improved structure for a caliper in accordance with this invention.
Figure 7:
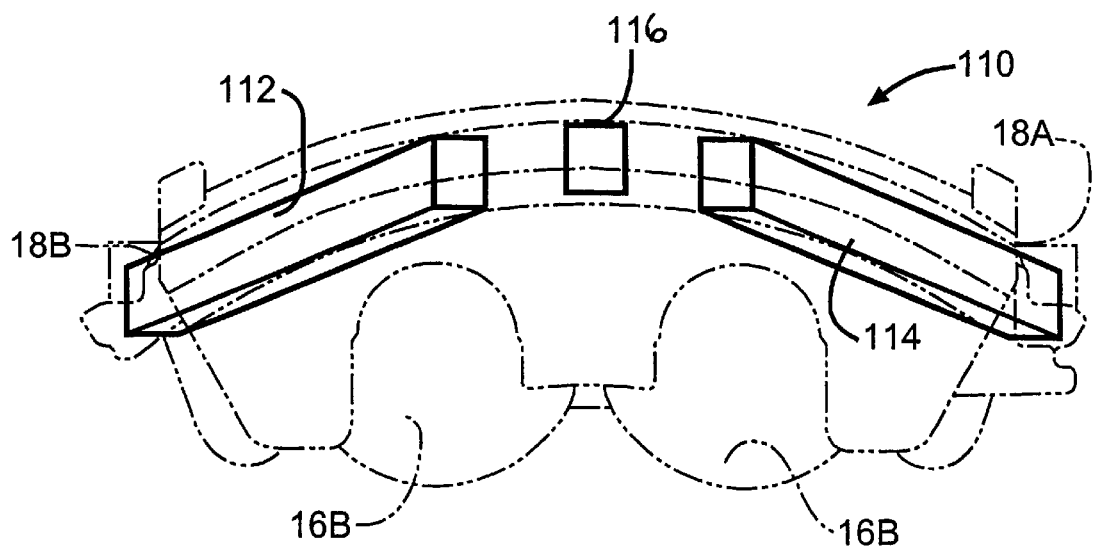
FIG. 7 is a side view of the caliper illustrated in FIG. 6.

Turning now to FIGS. 6 and 7 and using like reference numbers to indicate corresponding parts, there is illustrated a second embodiment of an improved structure for a caliper, indicated generally at 110, in accordance with this invention which can be used in place of the conventional caliper 12 of the prior art disc brake assembly 10 illustrated and described above in connection with FIGS. 1 through 3. Although the caliper 110 of this invention will be described and illustrated in conjunction with the particular prior art vehicle disc brake assembly 10 structure disclosed herein, it will be appreciated that it may be used in conjunction with other kinds of disc brake assembly structures.

The caliper 110 is preferably a fiber reinforced caliper formed from aluminum or alloys thereof and includes an inboard leg portion 16 and an outboard leg portion 14 which are interconnected by an intermediate bridge portion 18. More preferably, the caliper 110 is made from aluminum, such as for example, A354, A356, or A357, and is reinforced with one or more preforms or segments containing individual strands of ceramic fibers. The preforms are preferably formed from chopped alumina oxide fibers and are extruded or otherwise preformed into the predetermined preforms and are selectively disposed in a casting mold and molded integrally in situ therewith the aluminum caliper body during a casting process. The individual strands of the ceramic fibers are preferably alumina oxide ($Al_2O_3$) ceramic fibers. One example of suitable ceramic fibers are Nextel® ceramic fibers manufactured by Minnesota Mining and Manufacturing Company (a.k.a. 3M Corporation), of Saint Paul, Minn. Alternatively, the caliper 100 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 6 and 7, the caliper 110 includes three preforms 112, 114 and 116. The preform 112 has a generally square cross-sectional shape and is preferably disposed near the side 18B of the bridge 18 thereof the caliper 110. The preform 112 preferably extends across the entire axial width of the bridge 18 of the caliper 110 extending from the outboard leg 14 to the inboard leg 16. The individual strands of the ceramic fibers 112B (two of such strands 112B shown in FIG. 6 by a dashed line) in the preform 112 are preferably oriented in a direction as indicated by the arrow 112A and at an angle B1 with an axis X of the caliper 110. The angle B1 is in the range from about 15 degrees to about 75 degrees. More preferably, the angle B1 is in the range from about 35 degrees to about 55 degrees. In the illustrated embodiment, the angle B1 is about 45 degrees.

The preform 114 has a generally uniform square cross-sectional shape and is preferably disposed near the side 18A of the bridge 18 of the caliper 110. The preform 114 preferably extends across the entire axial width of the bridge 18 of the caliper 110 extending from the outboard leg 14 to the inboard leg 16. The individual strands of the ceramic fibers 114B (two of such strands 114B shown in FIG. 6 by a dashed line) in the preform 114 are preferably oriented in a direction as indicated by the arrow 114A and at an angle B2 with the axis X of the caliper 110. The angle B2 is in the range from about 15 degrees to about 75 degrees. More preferably, the angle B2 is in the range from about 35 degrees to about 55 degrees. In the illustrated embodiment, the angle B2 is about 45 degrees. In the illustrated embodiment, the angles B1 and B2 are shown as being the same. However, the angles B1 and B2 can be different from each other if so desired.

The preform 116 has a generally uniform cross-sectional shape and is preferably disposed generally intermediate the bores 16B of the caliper 110. The preform 106 extends across a portion of the bridge 18 of the caliper 110 extending from the inboard leg 16 toward the outboard leg 14. The individual strands of the ceramic fibers 116B (two of such strands 116B shown in FIG. 6 by a dashed line) in the preform 116 are preferably oriented in an axial direction as indicated by the arrow 116A and in particular relationship with the axis X of the caliper 110. Alternatively, the shape, location and/or number of one or more of the preforms 112, 114 and 116 of the caliper 110 can be other than illustrated if so desired.

Figure 8:
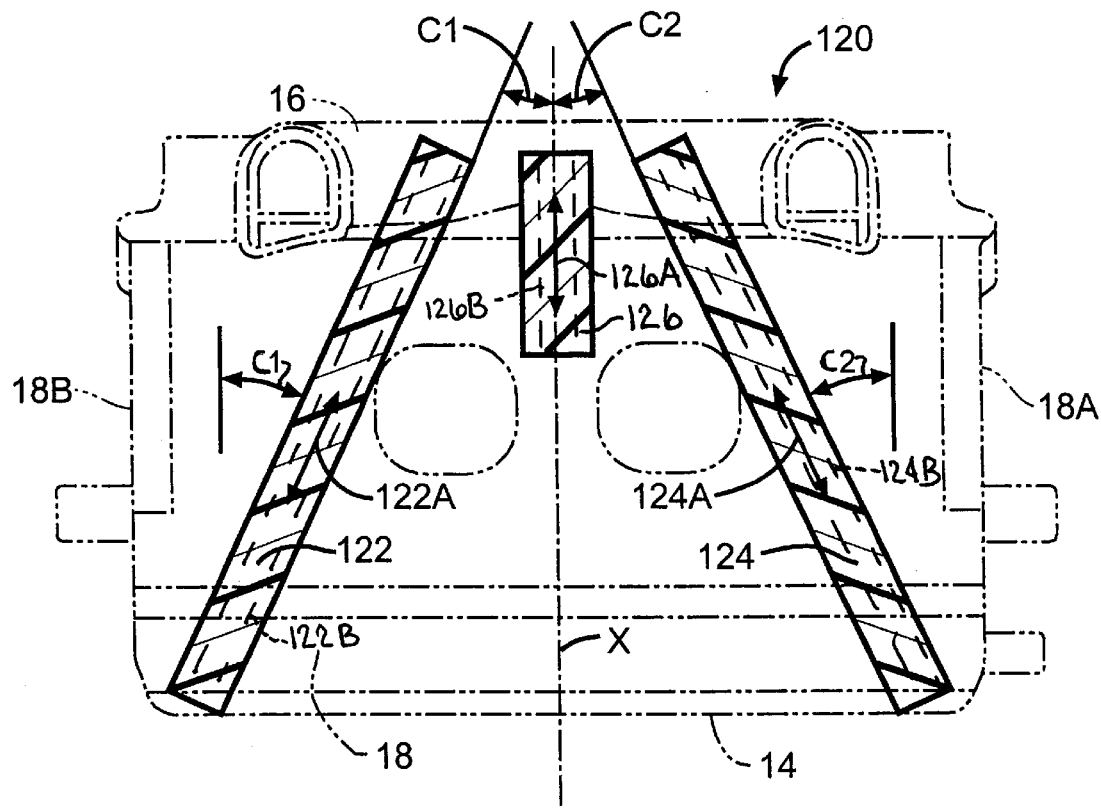
FIG. 8 is a top view of a third embodiment of an improved structure for a caliper in accordance with this invention.
Figure 9:
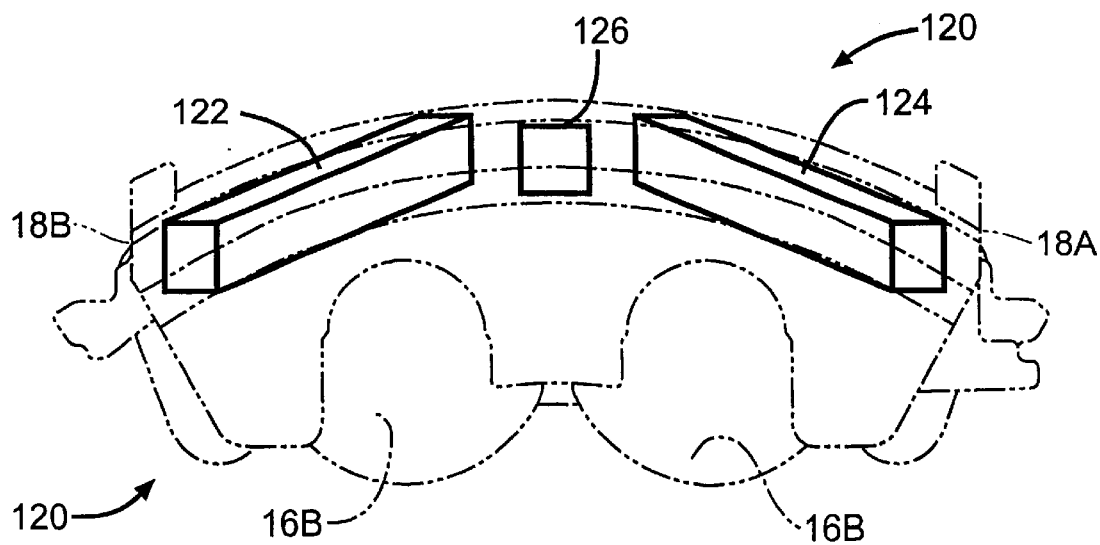
FIG. 9 is a side view of the caliper illustrated in FIG. 8.

Turning now to FIGS. 8 and 9 and using like reference numbers to indicate corresponding parts, there is illustrated a third embodiment of an improved structure for a caliper, indicated generally at 120, in accordance with this invention which can be used in place of the conventional caliper 12 of the prior art disc brake assembly 10 illustrated and described above in connection with FIGS. 1 through 3. Although the caliper 120 of this invention will be described and illustrated in conjunction with the particular prior art vehicle disc brake assembly 10 structure disclosed herein, it will be appreciated that it may be used in conjunction with other kinds of disc brake assembly structures.

The caliper 120 is preferably a fiber reinforced caliper formed from aluminum or alloys thereof and includes an inboard leg portion 16 and an outboard leg portion 14 which are interconnected by an intermediate bridge portion 18. More preferably, the caliper 120 is made from aluminum and is reinforced with one or more preforms or segments containing individual strands of aluminum oxide ceramic fibers. The preforms are preferably formed from chopped alumina oxide fibers and are extruded or otherwise preformed into the predetermined preforms and are selectively disposed in a casting mold and molded integrally in situ therewith the aluminum caliper body during a casting process. Alternatively, the caliper 120 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 8 and 9, the caliper 120 includes three preforms 122, 124 and 126. The preform 122 has a generally uniform cross-sectional shape and is preferably disposed near the side 18B of the bridge 18 thereof the caliper 120. The preform 122 preferably extends across the entire axial width of the bridge 18 of the caliper 120 extending from the outboard leg 14 to the inboard leg 16. The individual strands of the ceramic fibers 122B (two of such strands 122B shown in FIG. 8 by a dashed line) in the preform 122 are preferably oriented in a direction as indicated by the arrow 122A and an angle C1 with an axis X of the caliper 110. The angle C1 is in the range from about 15 degrees to about 75 degrees. More preferably, the angle C1 is in the range from about 35 degrees to about 55 degrees. In the illustrated embodiment, the angle C1 is about 45 degrees.

The preform 124 has a generally uniform cross-sectional shape and is preferably disposed near the side 18A of the bridge 18 of the caliper 120. The preform 124 preferably extends across the entire axial width of the bridge 18 of the caliper 120 extending from the outboard leg 14 to the inboard leg 16. The individual strands of the ceramic fibers 124B (two of such strands 124B shown in FIG. 8 by a dashed line) in the preform 124 are preferably oriented in a direction as indicated by the arrow 124A and at an angle C2 with the axis X of the caliper 120. The angle C2 is in the range from about 15 degrees to about 75 degrees. More preferably, the angle C2 is in the range from about 35 degrees to about 55 degrees. In the illustrated embodiment, the angle C2 is about 45 degrees.

The preform 126 has a generally uniform cross-sectional shape and is preferably disposed generally intermediate the bores 16B of the caliper 120. The preform 126 extends across a portion of the bridge 18 of the caliper 120 extending from the inboard leg 16 toward the outboard leg 14. The individual strands of the ceramic fibers 126B (two of such strands 126B shown in FIG. 8 by a dashed line) in the preform 126 are preferably oriented in an axial direction as indicated by the arrow 126A and in parallel relationship with the axis X of the caliper 20. Alternatively, the shape, location and/or number of one or more of the preforms 122, 124 and 126 of the caliper 120 can be other than illustrated if so desired.

Figure 10:
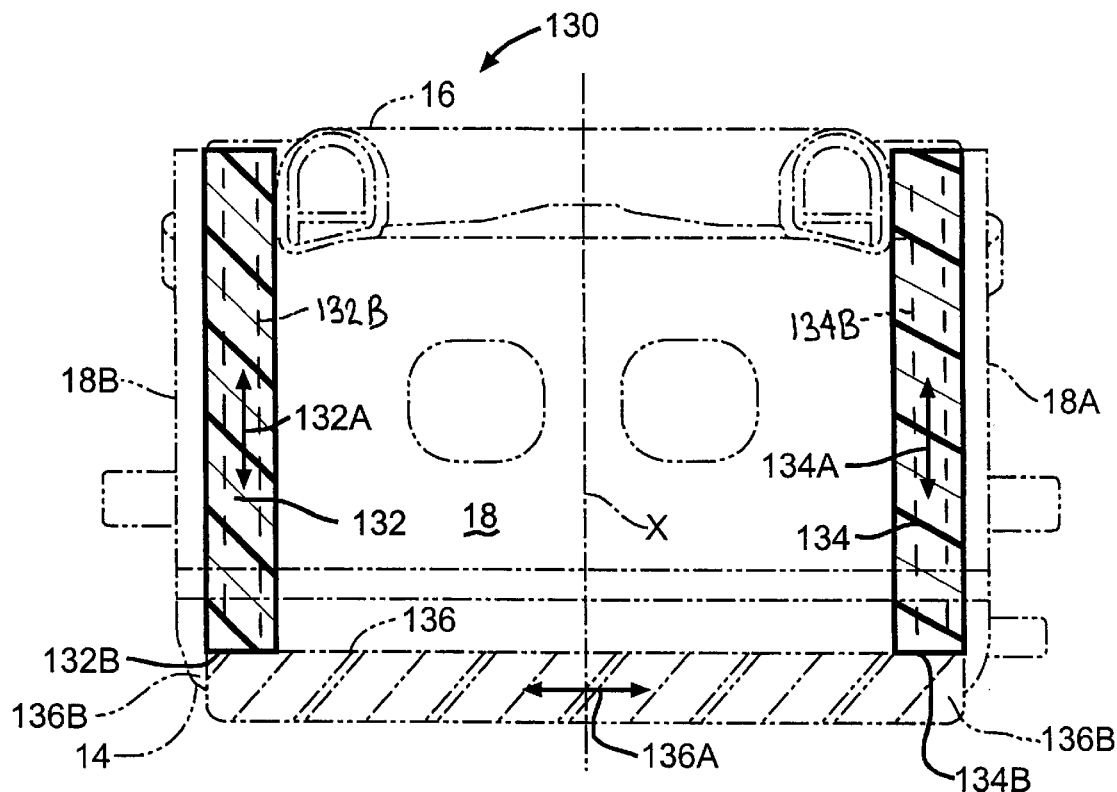
FIG. 10 is a top view of a fourth embodiment of an improved structure for a caliper in accordance with this invention.
Figure 11:
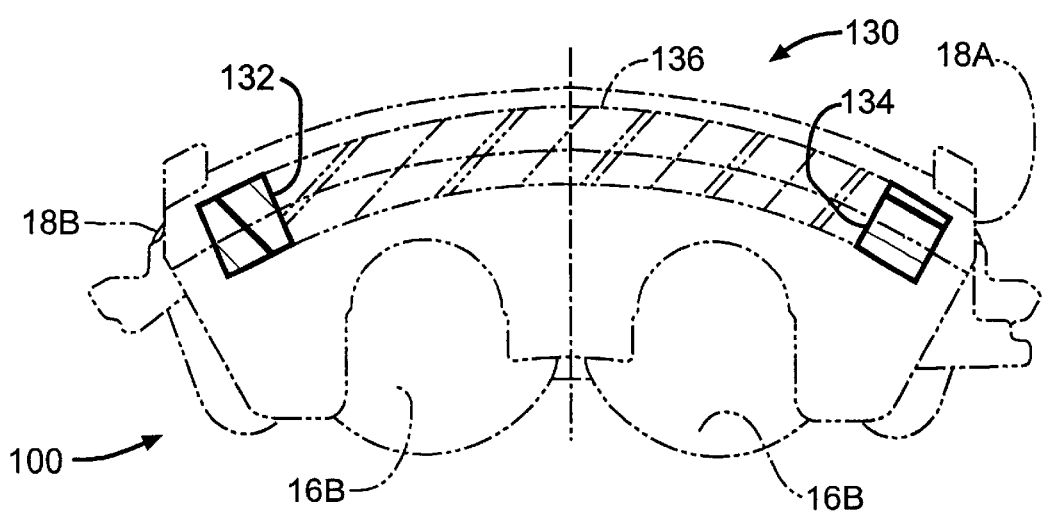
FIG. 11 is a side view of the caliper illustrated in FIG. 10.

Turning now to FIGS. 10 and 11 and using like reference numbers to indicate corresponding parts, there is illustrated a fourth embodiment of an improved structure for a caliper, indicated generally at 130, in accordance with this invention which can be used in place of the conventional caliper 12 of the prior art disc brake assembly 10 illustrated and described above in connection with FIGS. 1 through 3. Although the caliper 130 of this invention will be described and illustrated in conjunction with the particular prior art vehicle disc brake assembly 10 structure disclosed herein, it will be appreciated that it may be used in conjunction with other kinds of disc brake assembly structures.

The caliper 130 is preferably a fiber reinforced caliper formed from aluminum or alloys thereof and includes an inboard leg portion 16 and an outboard leg portion 14 which are interconnected by an intermediate bridge portion 18. More preferably, the caliper 130 is made from aluminum and is reinforced with one or more preforms or segments containing individual strands of aluminum oxide ceramic fibers. The preforms are preferably formed from chopped aluminum oxide fibers and are extruded or otherwise preformed into the predetermined preforms and are selectively disposed in a casting mold and molded integrally in situ therewith the aluminum caliper body during a casting process. Alternatively, the caliper 130 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 10 and 11, the caliper 130 includes three preforms 132, 134 and 136. The preform 132 has a generally uniform cross-sectional shape and is preferably disposed near the side 18B of the bridge 18 of the caliper 130. The preform 132 preferably extends across the entire axial width of the bridge 18 of the caliper 130 extending from the outboard leg 14 to the inboard leg 16. The individual strands of the ceramic fibers 132B (two of such strands 132B shown in FIG. 10 by a dashed line) in the preform 132 are preferably oriented in an axial direction as indicated by the arrow 132A and in parallel relationship with an axis X of the caliper 130.

The preform 134 has a generally uniform cross-sectional shape and is preferably disposed near the side 18A of the bridge 18 thereof the caliper 130. The preform 134 preferably extends across the entire axial width of the bridge 18 of the caliper 130 extending from the outboard leg 14 to the inboard leg 16. The individual strands of the ceramic fibers 134B (two of such strands 134B shown in FIG. 10 by a dashed line) in the preform 134 are preferably oriented in an axial direction as indicated by the arrow 134A and in parallel relationship with the axis X of the caliper 130.

The preform 136 is optional and has a generally uniform cross-sectional shape and is preferably disposed at an outer side of the bridge 18 of the caliper at the juncture of transition of the bridge 18 to the outboard leg 14. The preform 136 includes opposed ends 136B which are disposed adjacent outer ends 132B and 134B of the preforms 132 and 134, respectively. The individual strands of the ceramic fibers 136B (two of such strands 136B shown in FIG. 10 by a dashed line) in the preform 136 are preferably oriented in a direction as indicated by the arrow 136A and in crossing or perpendicular relationship with the axis X of the caliper 130. Alternatively, the shape, location and/or number of one or more of the preforms 132, 134 and 136 of the caliper 130 can be other than illustrated if so desired. Also, the caliper 130 could include additional preforms. For example, the caliper 130 could include a preform similar to the preform 106 shown and described above in connection with FIGS. 4 and 5.

Figure 12:
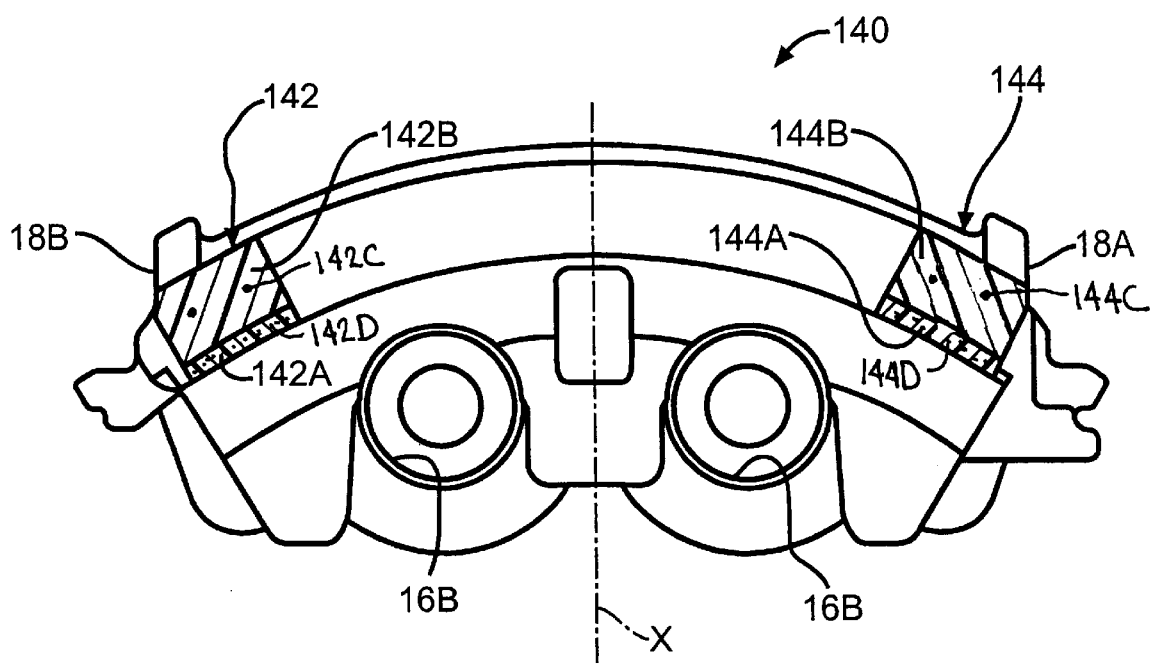
FIG. 12 is a top view of a fifth embodiment of an improved structure for a caliper in accordance with this invention.
Figure 13:
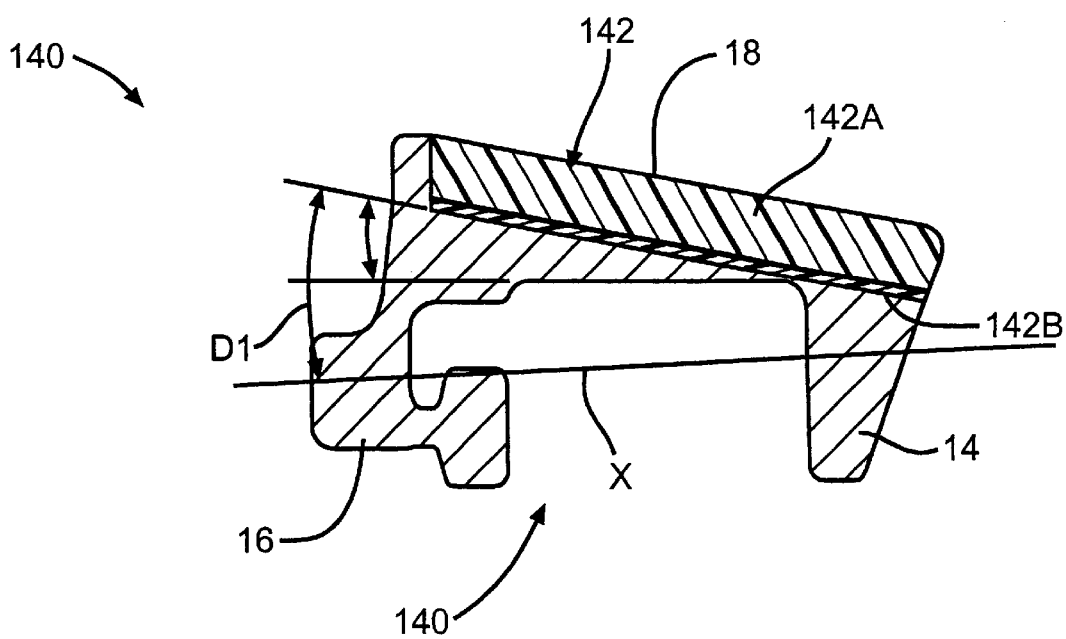
FIG. 13 is a side view of the caliper illustrated in FIG. 12.

Turning now to FIGS. 12 and 13 and using like reference numbers to indicate corresponding parts, there is illustrated a fifth embodiment of an improved structure for a caliper, indicated generally at 140, in accordance with this invention which can be used in place of the conventional caliper 12 of the prior art disc brake assembly 10 illustrated and described above in connection with FIGS. 1 through 3. Although the caliper 140 of this invention will be described and illustrated in conjunction with the particular prior art vehicle disc brake assembly 10 structure disclosed herein, it will be appreciated that it may be used in conjunction with other kinds of disc brake assembly structures.

The caliper 140 is preferably a fiber reinforced caliper formed from aluminum or alloys thereof and includes an inboard leg portion 16 and an outboard leg portion 14 which are interconnected by an intermediate bridge portion 18. More preferably, the caliper 140 is made from aluminum and is reinforced with one or more preforms or segments containing individual strands of aluminum oxide ceramic fibers, and chopped aluminum oxide ceramic fibers. The preforms are preferably formed from chopped aluminum oxide fibers and are extruded or otherwise preformed into the predetermined preforms and are selectively disposed in a casting mold and molded integrally in situ therewith the aluminum caliper body during a casting process. One example of suitable chopped ceramic fibers are Saffil® high aluminum ceramic fibers manufactured by Saffil Limited, of the United Kingdom. The preforms are formed by an extrusion process or other suitable process which combines the two different fibers into an unitary preform which is then selectively disposed in a casting mold and molded integrally in situ therewith the aluminum caliper body during a casting process. Alternatively, the caliper 140 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 12 and 13, the caliper 140 includes two preforms 142 and 144. The preform 142 has a generally uniform cross-sectional shape and is preferably disposed near the side 18B of the bridge 18 of the caliper 140. The preform 142 preferably extends across the entire axial width of the bridge 18 of the caliper 140 extending from the outboard leg 14 to the inboard leg 16. The preform 142 includes a first portion 142A having individual strands of ceramic fibers 142C (two of such strands 142C shown in FIG. 12 each by a single dot), and a second portion 142B having chopped ceramic fibers 142D (such chopped ceramic fibers shown in FIG. 12 by dots). Preferably, the preform 142 is oriented at an angle D1 with respect to the axis X of the caliper 140. The angle D1 is in the range from about 5 degrees to about 25 degrees. More preferably, the angle D1 is in the range from about 10 degrees to about 20 degrees. In the illustrated embodiment, the angle D1 is about 15 degrees. The individual strands of the ceramic fibers 142C in the first portion 142A of the preform 142 are preferably oriented in a generally axial direction and in a generally parallel relationship with an axis X of the caliper 140. The chopped ceramic fibers 142D in the second portion 142B of the preform 142 are preferably oriented in a generally axial direction and in a generally parallel relationship with the axis X of the caliper 140.

The preform 144 has a generally uniform cross-sectional shape and is preferably disposed near the side 18A of the bridge 18 thereof the caliper 140. The preform 144 preferably extends across the entire axial width of the bridge 18 of the caliper 140 extending from the outboard leg 14 to the inboard leg 16. The preform 144 includes a first portion 144A having individual strands of ceramic fibers 144C (two of such strands 144C shown in FIG. 12 each by a single dot), and a second portion 144B having chopped ceramic fibers 144D 136B (such chopped ceramic fibers shown in FIG. 12 by dots). Preferably, the preform 144 is oriented at an angle (not shown) with respect to the axis X of the caliper 140. The angle is preferably in the range from about 5 degrees to about 25 degrees. More preferably, the angle is in the range from about 10 degrees to about 20 degrees. In the illustrated embodiment, the angle is about 15 degrees. The individual strands of the ceramic fibers 144C in the first portion 144A of the preform 144 are preferably oriented in a generally axial direction and in a generally parallel relationship with the axis X of the caliper 140. The chopped ceramic fibers 144D in the second portion 144B of the preform 144 are preferably oriented in a generally axial direction and in a generally parallel relationship with the axis X of the caliper 140. Alternatively, the shape, location and/or number of one or both of the preforms 142 and 144 of the caliper 140 can be other than illustrated if so desired. Also, the caliper 140 could include additional preforms of a similar or different construction.

Figure 14:
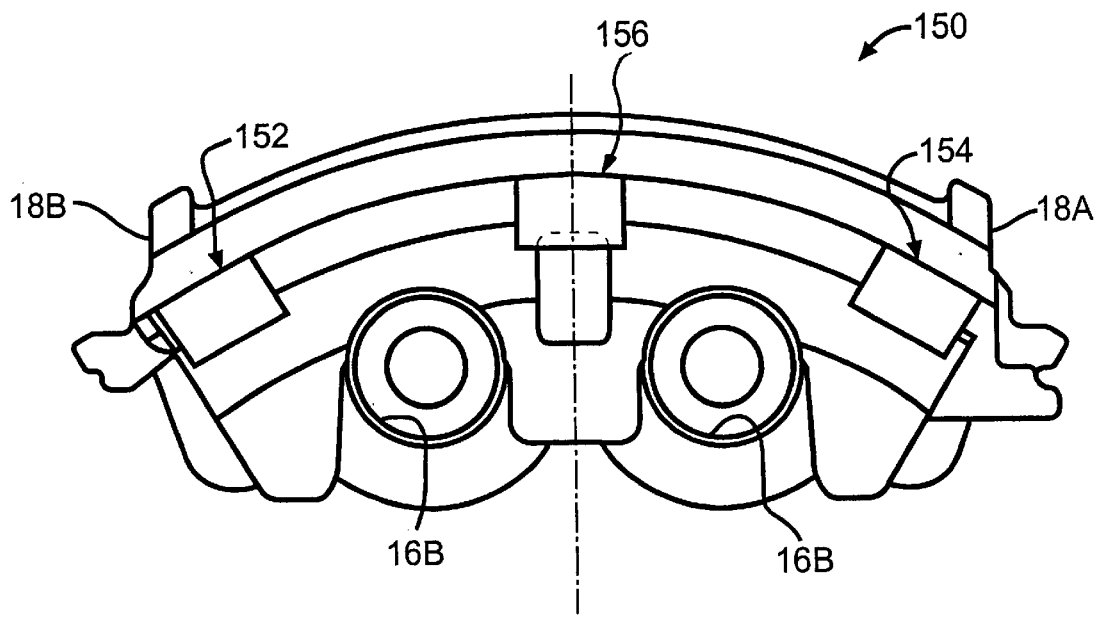
FIG. 14 is a top view of a sixth embodiment of an improved structure for a caliper in accordance with this invention.
Figure 15:
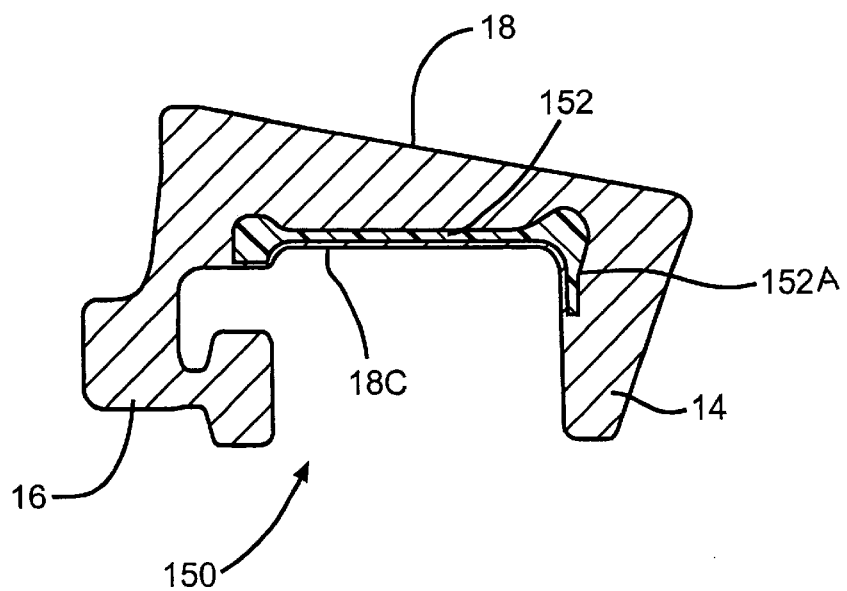
FIG. 15 is a side view of the caliper illustrated in FIG. 14.

Turning now to FIGS. 14 and 15 and using like reference numbers to indicate corresponding parts, there is illustrated a sixth embodiment of an improved structure for a caliper, indicated generally at 150, in accordance with this invention which can be used in place of the conventional caliper 12 of the prior art disc brake assembly 10 illustrated and described above in connection with FIGS. 1 through 3. Although the caliper 150 of this invention will be described and illustrated in conjunction with the particular prior art vehicle disc brake assembly 10 structure disclosed herein, it will be appreciated that it may be used in conjunction with other kinds of disc brake assembly structures.

The caliper 150 is preferably a metal reinforced caliper formed from aluminum or alloys thereof and includes an inboard leg portion 16 and an outboard leg portion 14 which are interconnected by an intermediate bridge portion 18. More preferably, the caliper 150 is made from aluminum and is reinforced with one or more preforms or segments formed from a powdered metal. A suitable powdered metal preform is preferably formed from steel, stainless steel, molybdenum, or Inconel® manufactured by Inco Alloys International, Inc., of Huntington, W. Va. The preforms are formed by a molding process of other suitable process which produces the preform which is then selectively disposed in a casting mold and molded integrally in situ therewith the aluminum caliper body during a casting process. Alternatively, the caliper 150 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 14 and 15, the caliper 150 includes three preforms 152, 154 and 156. The preform 152 has a non-uniform or varying cross-sectional shape and is preferably disposed near the side 18B of the bridge 18 and adjacent an underside 18C of the bridge 18 of the caliper 150. The preform 152 preferably extends across the entire axial width of the bridge 18 of the caliper 150 extending from the inboard leg 16 and into a portion of the outboard leg 14. In particular, the preform 152 includes an outer end portion 152A which extends radially downwardly into a portion of the outboard leg 14 of the caliper 150.

The preform 154 has a non-uniform or varying cross-sectional shape and is preferably disposed near the side 18A of the bridge 18 and adjacent the underside 18C of the bridge 18 of the caliper 150. The preform 154 preferably extends across the entire axial width of the bridge 18 of the caliper 150 extending from the inboard leg 16 and into a portion of the outboard leg 14. In particular, the preform 154 includes an outer end portion 154A which extends radially downwardly into a portion of the outboard leg 14 of the caliper 150.

The preform 156 is optional and is disposed generally intermediate the bores 16B of the caliper 150 and adjacent the underside 18C of the bridge 18 of the caliper 150. The preform 156 extends across a portion of the bridge 18 of the caliper 150 extending from the inboard leg 16 toward the outboard leg 14. Alternatively, the shape, location and/or number of one or more of the preforms 152, 154 and 156 of the caliper 150 can be other than illustrated if so desired.

Figure 16:
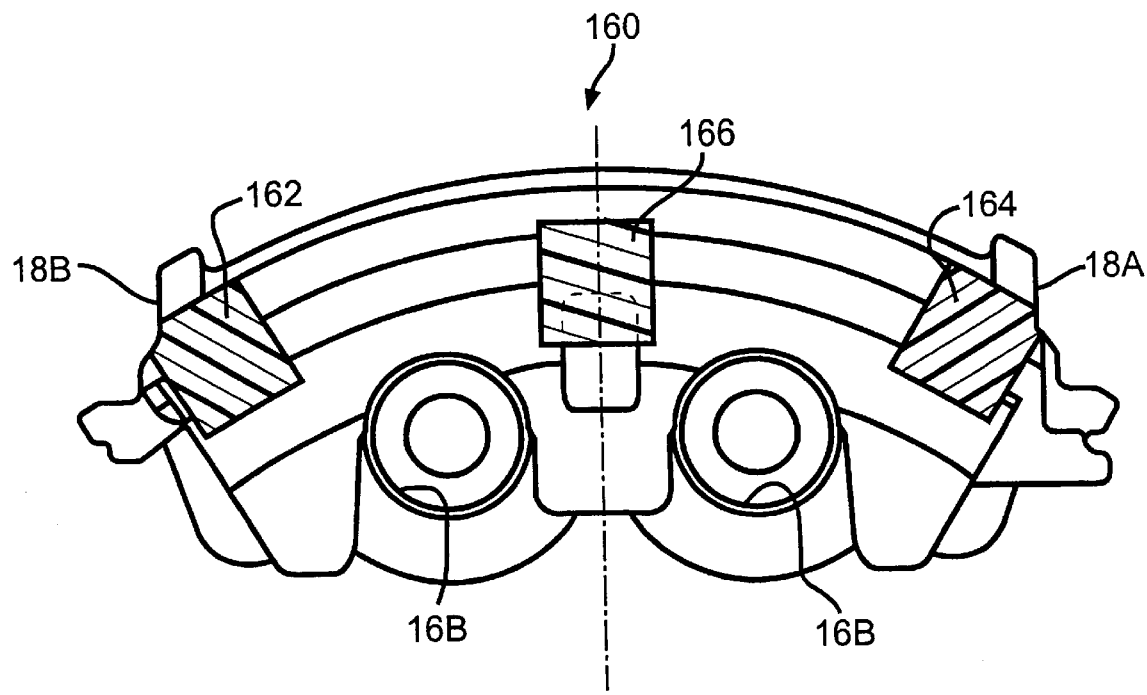
FIG. 16 is a top view of a seventh embodiment of an improved structure for a caliper in accordance with this invention.
Figure 17:
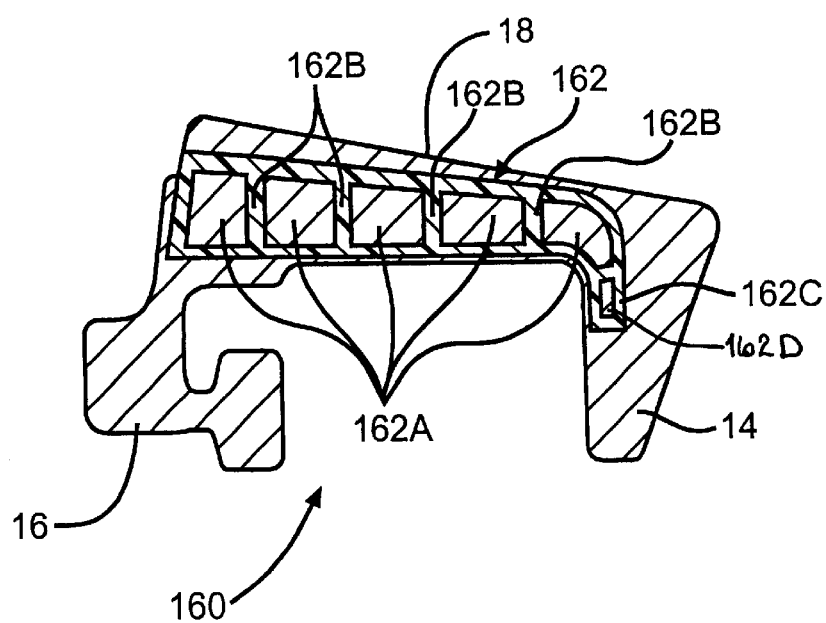
FIG. 17 is a side view of the caliper illustrated in FIG. 16.

Turning now to FIGS. 16 and 17 and using like reference numbers to indicate corresponding parts, there is illustrated a seventh embodiment of an improved structure for a caliper, indicated generally at 160, in accordance with this invention which can be used in place of the conventional caliper 12 of the prior art disc brake assembly 10 illustrated and described above in connection with FIGS. 1 through 3. Although the caliper 150 of this invention will be described and illustrated in conjunction with the particular prior art vehicle disc brake assembly 10 structure disclosed herein, it will be appreciated that it may be used in conjunction with other kinds of disc brake assembly structures.

The caliper 160 is preferably a metal reinforced caliper formed from aluminum or alloys thereof and includes an inboard leg portion 16 and an outboard leg portion 14 which are interconnected by an intermediate bridge portion 18. More preferably, the caliper 160 is made from aluminum and is reinforced with one or more preforms or segments formed from powdered metal. A suitable powdered metal preform is preferably formed from steel, stainless steel, molybdenum, or Inconel®. The preforms are formed by a molding process or other suitable process which produces the preform which is then selectively disposed in a casting mold and molded integrally in situ therewith the aluminum caliper body during a casting process. Alternatively, the caliper 160 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 16 and 17, the caliper 160 includes three preforms 162, 164 and 166. The preform 162 includes a plurality of pockets or open cavities 162A separated from each other by a wall 162B. The illustrated preform 162 is provided with five pockets 162A and four walls 162B. The preform 162 has a non-uniform cross-sectional shape and is preferably disposed near the side 18B of the bridge 18 and adjacent an underside 18C of the bridge 18 of the caliper 160. The preform 162 preferably extends across the entire axial width of the bridge 18 of the caliper 160 extending from the inboard leg 16 and into a portion of the outboard leg 14. In particular, the preform 162 includes an outer end portion 162C which extends radially downwardly into a portion of the outboard leg 14 of the caliper 160. In the illustrated embodiment, the outer end portion includes a pocket 162D.

The preform 164 includes a plurality of pockets or open cavities (not shown) separated from each other by a wall (not shown). The preform 164 has a non-uniform cross-sectional shape and is preferably disposed near the side 18A of the bridge 18 and adjacent an underside 18C of the bridge 18 of the caliper 160. The preform 164 preferably extends across the entire axial width of the bridge 18 of the caliper 160 extending from the inboard leg 16 and into a portion of the outboard 14. In particular, the preform 164 includes an outer end portion 164C which extends radially downwardly into a portion of the outboard leg 14 of the caliper 160.

The preform 166 is optional and is preferably disposed generally intermediate the bores 16B of the caliper 160 and adjacent the underside 18C of the bridge 18 of the caliper 160. The preform 166 extends across a portion of the bridge 18 of the caliper 160 extending from the inboard leg 16 toward the outboard leg 14. The preform 166 can include one or more pockets (not shown) similar to that of preform 162 or can be similar to any of the other preforms described and illustrated hereinbefore or hereinafter. Alternatively, the shape, location and/or number of one or more of the performs 162, 164 and 166 of the caliper 160 can be other than illustrated if so desired.

Figure 18:
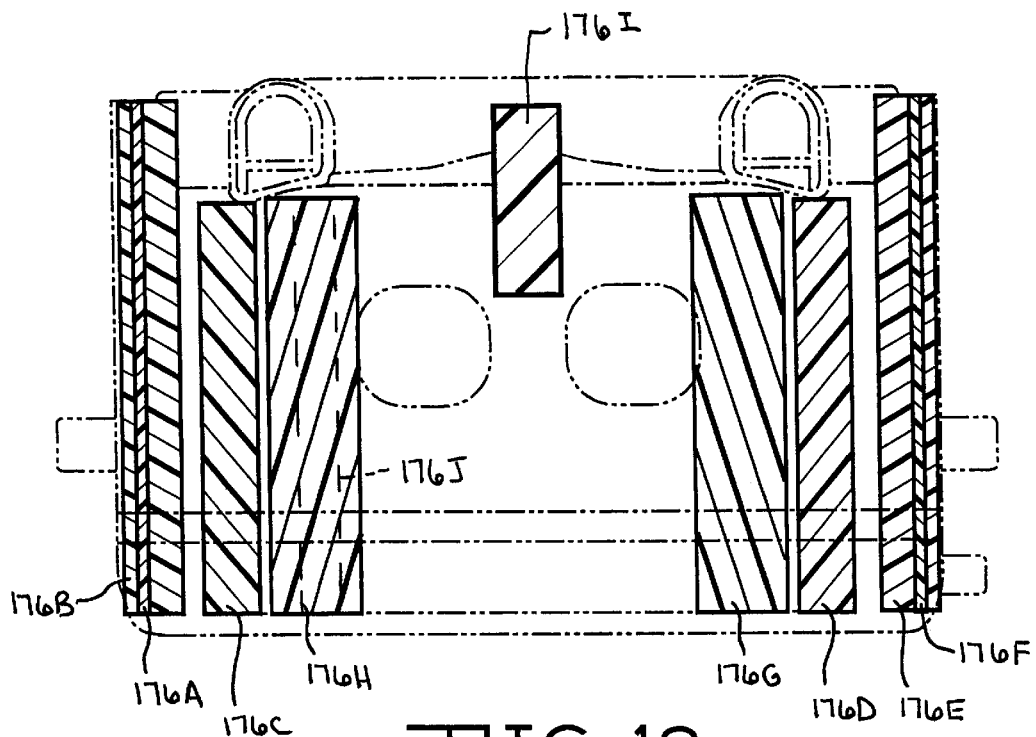
FIG. 18 is a top view of an eighth embodiment of an improved structure for a caliper in accordance with this invention.
Figure 19:
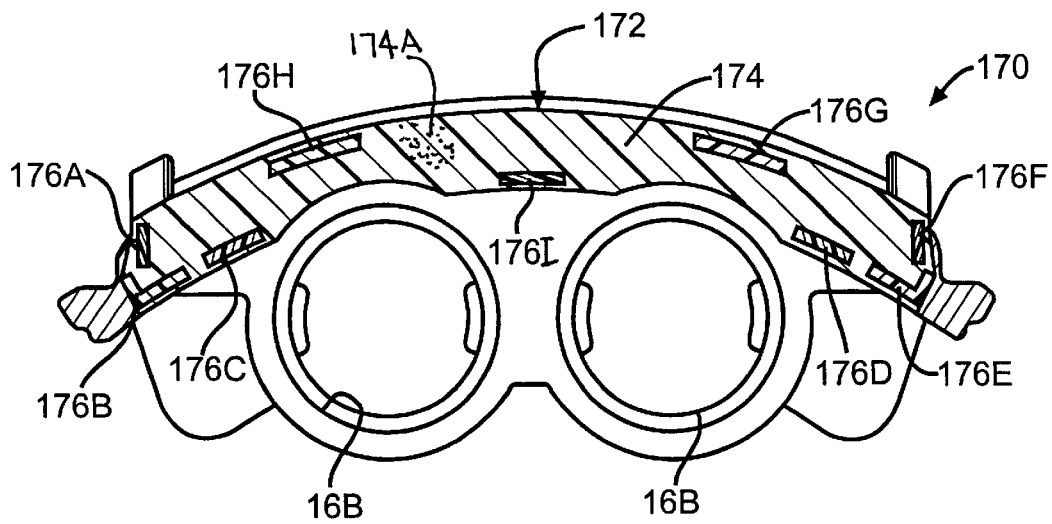
FIG. 19 is a side view of the caliper illustrated in FIG. 18.

Turning now to FIGS. 18 and 19 and using like reference numbers to indicate corresponding parts, there is illustrated an eighth embodiment of an improved structure for a caliper, indicated generally at 170, in accordance with this invention which can be used in place of the conventional caliper 12 of the prior art disc brake assembly 10 illustrated and described above in connection with FIGS. 1 through 3. Although the caliper 170 of this invention will be described and illustrated in conjunction with the particular prior art vehicle disc brake assembly 10 structure disclosed herein, it will be appreciated that it may be used in conjunction with other kinds of disc brake assembly structures.

The caliper 170 is preferably a fiber reinforced caliper formed from aluminum or alloys thereof and includes an inboard leg portion 16 and an outboard leg portion 14 which are interconnected by an intermediate bridge portion 18. More preferably, the caliper 170 is made from aluminum and is reinforced with one preform or segment containing individual strands of aluminum oxide ceramic fibers, and chopped aluminum oxide fibers. The preforms are preferably formed from chopped alumina oxide fibers and are formed by an extrusion process or other suitable process which enables the two different fibers to be combined into an unitary perform which is then selectively disposed in a casting mold and molded integrally in situ therewith the aluminum caliper body during a casting process. Alternatively, the caliper 170 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 18 and 19, the caliper 170 includes a single preform 172. The preform 172 has a generally uniform cross-sectional shape and preferably spans or covers substantially the entire portion of the bridge 18 of the caliper 140. Alternatively, the preform 172 can cover the entire portion of the bridge 18 of the caliper 170 or can cover substantially less than the entire portion of the bridge 18 of the caliper 170. The preform 172 includes a first or main body portion 174 which preferably includes chopped fibers 174A (such chopped fibers 174A shown in only a portion of FIG. 19 by dots), and a plurality of second portions including individual strands of fibers 176J (such individual strands of fibers 176J shown in FIG. 18 only portion 176H by a dashed line) which are selectively located within the first portion 174. As shown in this embodiment, the preform 172 includes nine second portions indicated at 176A–176I. Each of the second portions 176A–176I is preferably located below the adjacent outer surface of the first portion 174. In this embodiment, the secondary portions 176A–176H preferably extend across the entire axial width of the bridge 18 of the caliper 170 extending from the outboard leg 14 to the inboard leg 16 thereof. The secondary portion 176I extends across a portion of the bridge 18 of the caliper 170 extending from the inboard leg 16 toward the outboard leg 14. Alternatively, the shape, location, and or number of the preform 172, the first portion 174, and the second portions 176A–176I can be other than illustrated if so desired. For example, the preform 172 could be divided into two or more individual preform sections.

Figure 20:
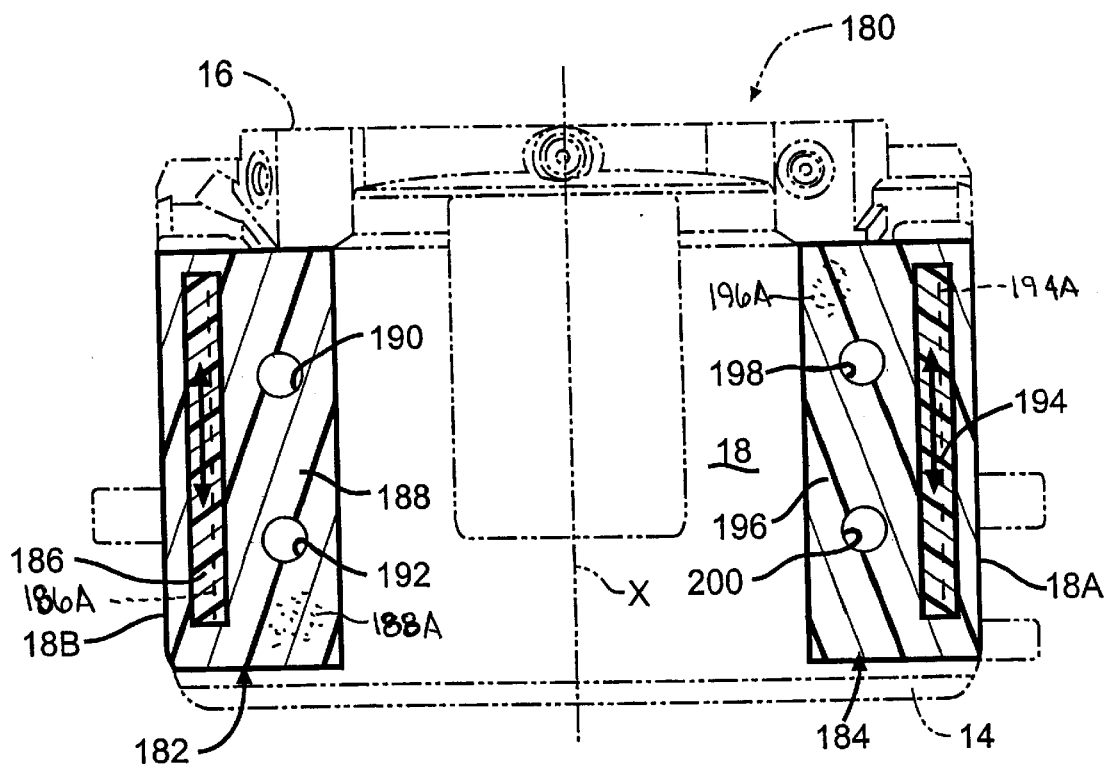
FIG. 20 is a top view of a ninth embodiment of an improved structure for a caliper in accordance with this invention.
Figure 21:
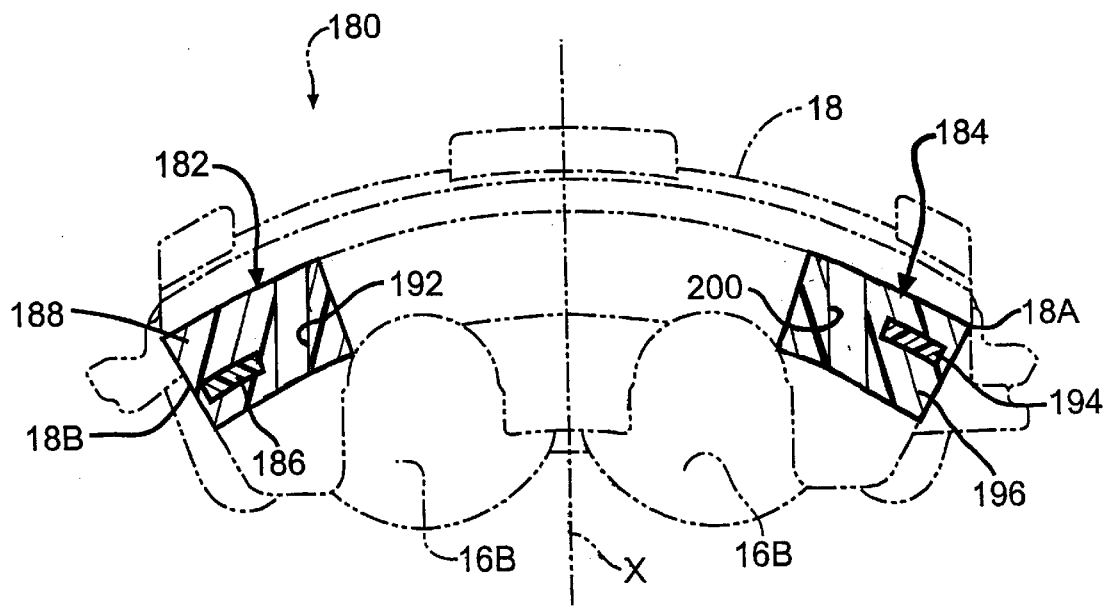
FIG. 21 is a side view of the caliper illustrated in FIG. 20.

Turning now to FIGS. 20 and 21 and using like reference numbers to indicate corresponding parts, there is illustrated a ninth embodiment of an improved structure for a caliper, indicated generally at 180, in accordance with this invention which can be used in place of the conventional caliper 12 of the prior art disc brake assembly 10 illustrated and described above in connection with FIGS. 1 through 3. Although the caliper 180 of this invention will be described and illustrated in conjunction with the particular prior art vehicle disc brake assembly 10 structure disclosed herein, it will be appreciated that it may be used in conjunction with other kinds of disc brake assembly structures.

The caliper 180 is preferably a fiber reinforced caliper formed from aluminum or alloys thereof and includes an inboard leg portion 16 and an outboard leg portion 14 which are interconnected by an intermediate bridge portion 18. More preferably, the caliper 180 is made from aluminum and is reinforced with one or more preforms or segments containing individual strands of ceramic fibers and chopped ceramic fibers. The preforms are preferably formed from chopped alumina oxide fibers and are formed by an extrusion process or other suitable process which combines the two different fibers into an unitary preform which is then selectively disposed in a casting mold and molded integrally in situ therewith the aluminum caliper body during a casting process. Alternatively, the caliper 180 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIGS. 20 and 21, the caliper 180 includes two preforms 182 and 184. The preform 182 has a generally uniform cross-sectional shape and is preferably disposed near the side 18B of the bridge 18 of the caliper 140. The preform 182 preferably extends across the entire axial width of the bridge 18 of the caliper 180 extending from the outboard leg 14 to the inboard leg 16.

The preform 182 includes a first portion 186 including individual strands of the ceramic fibers 186A (one of such individual strands of fibers 186A shown in FIG. 20 by a dashed line), and a second portion 188 including chopped ceramic fibers 188A (such chopped fibers 188AB shown in FIG. 18 only in a portion thereof by dots). The individual strands of the ceramic fibers 186A in the first portion 186 of the preform 182 are preferably oriented in a generally axial direction and in a generally parallel relationship with an axis X of the caliper 180. The chopped fibers 188A in the second portion 188 of the preform 182 are preferably oriented in a generally axial direction and in a generally parallel relationship with the axis X of the caliper 180.

The preform 182 is preferably provided with one or more through or blind openings. In the illustrated embodiment, the preform 182 is provided with two through openings 190 and 192 which extend completely through the preform 182. In the illustrated embodiment, the openings 190 and 192 are formed in the second portion 188 of the preform 182. As will be described below, the openings 190 and 192 are effective to locate and maintain the preform 182 in a desired position in a mold apparatus during a molding process of the caliper 180. Alternatively, the shape, depth, number and/or the location of the openings 190 and 192 can be other than illustrated if desired.

The preform 184 has a generally uniform cross-sectional shape and is preferably disposed near the side 18A of the bridge 18 of the caliper 140. The preform 184 preferably extends across the entire axial width of the bridge 18 of the caliper 180 extending from the outboard leg 14 to the inboard leg 16.

The preform 184 includes a first portion 194 including individual strands of the ceramic fibers 194A (one of such individual strands of fibers 194A shown in FIG. 20 by a dashed line), and a second portion 196 including chopped ceramic fibers 196A (such chopped fibers 196A shown in FIG. 20 only in a portion thereof by dots). The individual strands of the ceramic fibers 194A in the first portion 194 of the preform 184 are preferably oriented in a generally axial direction and in a generally parallel relationship with an axis X of the caliper 180. The chopped ceramic fibers 196A in the second portion 196 of the preform 184 are preferably oriented in a generally axial direction and in a generally parallel relationship with the axis X of the caliper 180.

The preform 184 is preferably provided with one or more through or blind openings. In the illustrated embodiment, the preform 184 is provided with two through openings 198 and 200 which extend completely through the preform 182 In the illustrated embodiment, the openings 198 and 200 are formed in the second portion 16 of the preform 184 and have a generally circular shape. As will be described below, the openings 198 and 200 are effective to locate and maintain the preform 184 in a desired position in a mold apparatus during a molding process of the caliper 180. Alternatively, the shape, depth, number and/or the location of the openings 198 and 200 can be other than illustrated if desired. For example, the preform 184 can include only one opening having a non-circular shape.

Figure 22:
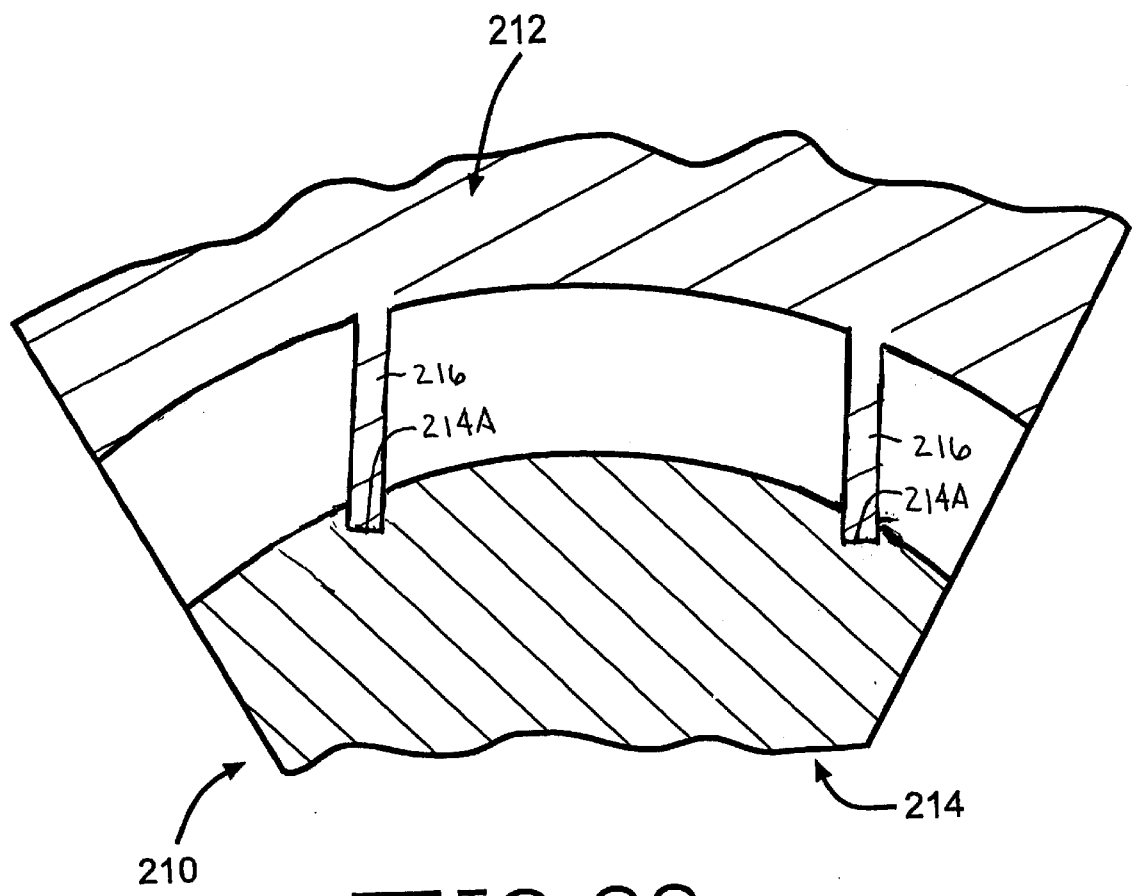
FIG. 22 is a sectional view of a portion of a mold apparatus used to produce the caliper shown in FIGS. 20 and 21.

Referring to FIG. 22, there is illustrated a sectional view of a portion of a molding apparatus, indicated generally at 210, which can be used to produce the caliper 180. As shown therein, the mold apparatus 210 includes an upper mold section 212 and a lower mold section 214. In the illustrated embodiment, the upper mold section 212 includes a plurality of downwardly extending projections 216. The number of the projections 216 preferably correspond to the number of openings provided in the preforms 182 and 184. In this embodiment the mold apparatus 210 includes four projections 216 (only two of which are shown in FIG. 22), which are operative to extend completely through the associated openings 190 and 192 and 196 and 198 of the preforms 182 and 184, respectively, and are received in corresponding openings 214A provided in the lower mold section 214. Alternatively, the projections 216 could extend less than completely through one or more of the associated openings 190 and 192 and 196 and 198 of the respective preforms 182 and 184 if so desired. As a result, the preforms 182 and 184 are located in the molding apparatus 210 in a predetermined position. Alternatively, the number, length, structure and/or location of the projections 216 can be other than illustrated if so desired. For example, the projections 216 could be upwardly extending projections provided only on the lower mold section 214, or at least one or more of the projections 216 could be provided on both the upper mold section 212 and the lower mold section 216. Also, projections (not shown) could be provided on the preforms 182 and 184 and corresponding openings or recesses provided in one or both of the mold sections 214 and 216 for receiving such projections.

Figure 23:
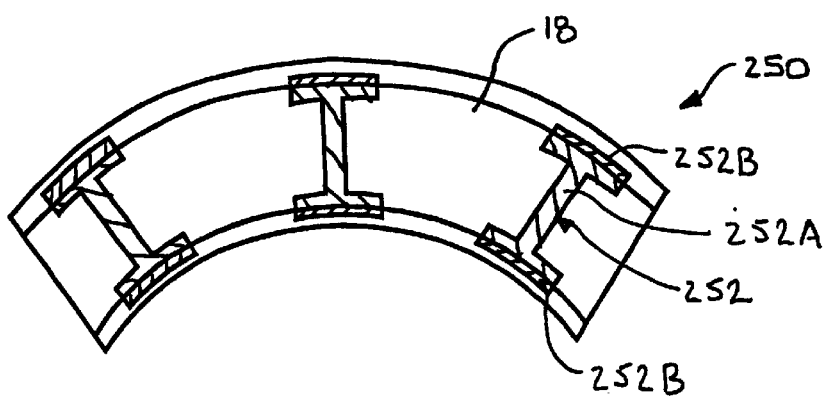
FIG. 23 is a side view of a portion of a tenth embodiment of an improved structure for a caliper in accordance with this invention.

Turning now to FIG. 23 and using like reference numbers to indicated corresponding parts, there is illustrated a portion of a tenth embodiment of an improved structure for a caliper, indicated generally at 250, in accordance with this invention which can be used in place of the conventional caliper 12 of the prior art disc brake assembly 10 illustrated and described above in connection with FIGS. 1 through 3. Although the caliper 250 of this invention will be described and illustrated in conjunction with the particular prior art vehicle disc brake assembly 10 structure disclosed herein, it will be appreciated that it may be used in conjunction with other kinds of disc brake assembly structures. As shown therein, the bridge portion 18 of the caliper 250 in this embodiment is reinforced with generally I-shaped preforms or segments 252.

Each of the preforms 252 includes a first portion 252A having chopped ceramic fibers 252C (such chopped fibers 252C shown in FIG. 23 by dots), and a second outer portions 252B including individual strands of ceramic fibers 252D (such individual strands of ceramic fibers 252D shown in FIG. 23 by a dashed line).

Figure 24:
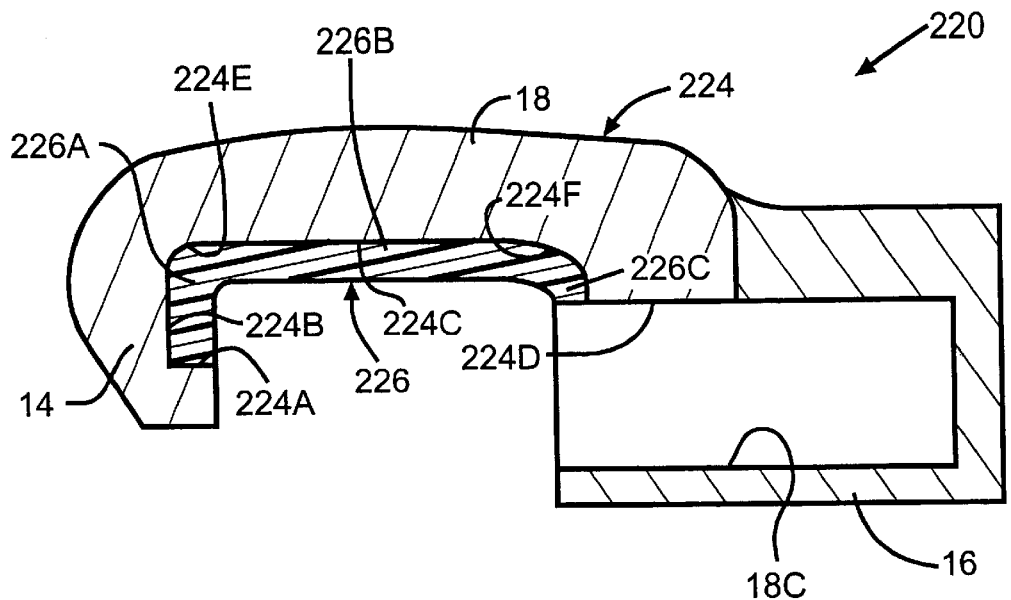
FIG. 24 is a side view of an eleventh embodiment of an improved structure for a caliper in accordance with this invention.

Turning now to FIG. 24 and using like reference numbers to indicate corresponding parts, there is illustrated an eleventh embodiment of an improved structure for a caliper, indicated generally at 220, in accordance with this invention which can be used in place of the conventional caliper 12 of the prior art disc brake assembly 10 illustrated and described above in connection with FIGS. 1 through 3. Although the caliper 220 of this invention will be described and illustrated in conjunction with the particular prior art vehicle disc brake assembly 10 structure disclosed herein, it will be appreciated that it may be used in conjunction with other kinds of disc brake assembly structures.

The caliper 220 is preferably a reinforced caliper formed from aluminum or alloys thereof and includes an inboard leg portion 16 and an outboard leg portion 14 which are interconnected by an intermediate bridge portion 18. More preferably, the caliper 220 is made from aluminum and is reinforced with one or more preforms or segments formed from powdered metal. A suitable powdered metal preform is preferably formed from steel, stainless steel, molybdenum, and Inconel®. The preforms are formed by a molding process or other suitable process which produces the preform which is then selectively disposed in a casting mold and molded integrally in situ therewith the aluminum caliper body during a casting process. Alternatively, the caliper 240 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIG. 24, the caliper 220 includes a first preform 224 and a second preform 226. The first preform 224 is a reinforced preform preferably formed from ceramic particles. The second preform 226 is a reinforced preform preferably formed from the ceramic fibers. The reinforced preforms 224 and 226 are preferably formed by a molding process or other suitable process which produces the preforms which are then selectively disposed in a casting mold and molded integrally in situ therewith the aluminum caliper body during a casting process. Alternatively, the caliper 220 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIG. 24, the preform 224 has a generally C-shaped cross-sectional shape and includes a first generally flat surface 224A, a second generally upwardly extending surface 224B, a third generally flat surface 224C, and a fourth generally flat surface 224D. In the illustrated embodiment, the preform includes a generally curved transition surface 224E between the first second surface 224B and the third surface 224C, and a generally curved transition surface 224F between the third surface 224C and the fourth surface 224D. The first surface 224A defines a shoulder, and the fourth surface 224D defines a portion of the counterbore 16B.

The preform 226 has a generally C-shaped cross-sectional shape and includes a first portion 226A, a second portion 226B, and a third portion 226C. In the illustrated embodiment, the first portion 226A extends radially downwardly into a portion of the outboard leg 14 of the caliper 220, the second portion 226B extends across the entire axial width of the bridge 18 of the caliper 220, and the third portion 226C extends radially downwardly into a portion of the inboard leg 16 and defines a portion of the counterbore 16B. Alternatively, the shape, location and/or number of one or more of the preforms 224 and 226 of the caliper 220 can be other than illustrated if so desired.

Figure 25:
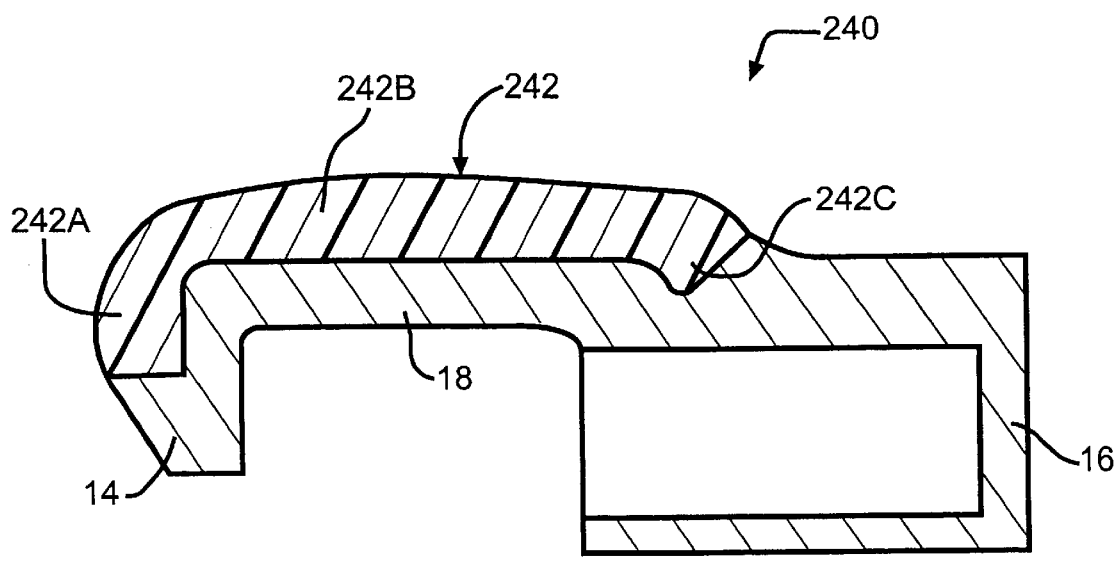
FIG. 25 is a side view of a twelfth embodiment of an improved structure for a caliper in accordance with this invention.

Turning now to FIG. 25 and using like reference numbers to indicate corresponding parts, there is illustrated an twelfth embodiment of an improved structure for a caliper, indicated generally at 240, in accordance with this invention which can be used in place of the conventional caliper 12 of the prior art disc brake assembly 10 illustrated and described above in connection with FIGS. 1 through 3. Although the caliper 240 of this invention will be described and illustrated in conjunction with the particular prior art vehicle disc brake assembly 10 structure disclosed herein, it will be appreciated that it may be used in conjunction with other kinds of disc brake assembly structures.

The caliper 240 is preferably a reinforced caliper formed from aluminum or alloys thereof and includes an inboard leg portion 16 and an outboard leg portion 14 which are interconnected by an intermediate bridge portion 18. More preferably, the caliper 240 is made from aluminum and is reinforced with one or more preforms or segments formed from a powdered metal. A suitable powdered metal preform is preferably formed from steel, stainless steel, molybdenum, and Inconel®. The preforms are formed by a molding process or other suitable process which produces the preform which is then selectively disposed in a casting mold and molded integrally in situ therewith the aluminum caliper body during a casting process. Alternatively, the caliper 240 can be formed from other metals, such as nodular iron, or a combination of two different metals, such as for example, an aluminum based metal matrix composite (MMC) containing silicon carbide particulate reinforcement, aluminum oxide fibers, and aluminum.

As shown in FIG. 25, the caliper 240 includes a preform 242 having a generally C-shaped cross-sectional shape and includes a first portion 242A, a second portion 242B, and a third portion 242C. In the illustrated embodiment, the first portion 242A extends radially downwardly into a portion of the outboard leg 14 of the caliper 240, the second portion 242B extends across the entire axial width of the bridge 18 of the caliper 220, and the third portion 242C extends radially downwardly into a portion of the inboard leg 16. Alternatively, the shape, location and/or number of the preform 242 of the caliper 220 can be other than illustrated if so desired. In this embodiment, the preform 242 is in that part of the casting which is in compression during pressurization of the casting apparatus.

While the calipers 100, 110, 120, 130, 140, 150, 160, 170, 180, 210, 220 and 240 of this invention have been illustrated and described in connection with a "sliding" caliper type of disc brake assembly, the invention may be used with other types of brake assemblies. For example, the invention may be used in connection with a "fixed" caliper type of disc brake assembly (not shown), or may be used in connection with a drum-in-hat type of disc brake assembly (not shown), wherein the disc brake assembly includes a disc service brake and a drum parking and emergency brake.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for producing a composite brake caliper adapted for use in a vehicle brake assembly comprising the steps of:
    (a) providing a molding apparatus having at least a pair of mold sections, at least one of the pair of mold sections including at least one projection extending from a surface thereof;
    (b) providing at least one reinforced preform formed from at least a first material, the preform having at least one opening formed at least partially therein;
    (d) positioning the preform in the molding apparatus with the projection of the mold section extending into the opening of the preform so as to orient the preform in a predetermined position within the molding apparatus; and
    (e) casting a caliper body formed from a second material in situ therewith to produce the composite brake caliper;
    wherein the preform is formed from chopped alumina oxide fibers and is reinforced with a material selected from the group consisting of individual strands of ceramic fibers and chopped ceramic fibers.

2. The method according to claim 1 wherein in step (d) the preform is positioned in the molding apparatus in the predetermined position so as to be in a bridge portion of the composite brake caliper which is formed during step (e).

3. The method according to claim 2 wherein the preform extends across an entire axial width of the bridge portion of the composite brake caliper extending from an outboard leg to an inboard leg thereof.

4. The method according to claim 2 wherein the preform is in an underside of the bridge portion of the composite caliper.

5. The method according to claim 1 wherein in step (b) two preforms are provided and in step (d) the two preforms are positioned in the molding apparatus in the predetermined positions so as to be near opposed sides of a bridge portion of the composite caliper which is formed during step (e).

6. The method according to claim 5 wherein the two preforms are oriented at an angle with respect to an axis of the caliper.

7. The method according to claim 1 wherein the opening in the preform extends completely therethrough.

8. The method according to claim 1 wherein the preform is wholly within the caliper body.

9. The method according to claim 1 wherein the preform has a generally uniform shape.

10. A brake caliper produced according to the method of claim 1.

11. A method for producing a composite brake caliper adapted for use in a vehicle brake assembly comprising the steps of:
    (a) providing a molding apparatus having at least a pair of mold sections, at least one of the pair of mold sections including at least one projection extending from a surface thereof;
    (b) providing at least one reinforced preform formed from at least a first material, the preform having at least one opening formed at least partially therein;
    (d) positioning the preform in the molding apparatus with the projection of the mold section extending into the opening of the preform so as to orient the preform in a predetermined position within the molding apparatus; and (e) casting a caliper body formed from a second material in situ therewith to produce the composite brake caliper;

wherein the opening in the preform extends completely therethrough, the other one of the pair of mold sections includes a recess formed therein, and the projection of the mold section extends through the opening and is disposed in a recess provided in the other one of the pair of mold sections.

12. The method according to claim 11 wherein the preform is formed from a powdered metal material.

13. The method according to claim 11 wherein the preform is formed from a first material and is reinforced with a second material.

14. The method according to claim 11 wherein in step (d) the preform in positioned in the molding apparatus in the predetermined position so as to be in a bridge portion of the composite brake caliper which is formed during step (e).

15. The method according to claim 14 wherein the preform extends across an entire axial width of the bridge portion of the composite brake caliper extending from an outboard leg to an inboard leg thereof.

16. The method according to claim 14 wherein the preform is in an underside of the bridge portion of the composite caliper.

17. The method according to claim 11 wherein the caliper body is formed from a material selected from the group consisting of aluminum or alloys thereof, nodular iron, or a combination of two different metals.

18. The method according to claim 11 wherein the preform is a unitary composite perform including a first portion reinforced with a first material and second portion reinforced with a second material.

19. The method according to claim 11 wherein in step (b) two preforms are provided and in step (d) the two preforms are positioned in the molding apparatus in the predetermined positions so as to be near opposed sides of a bridge portion of the composite caliper which is formed during step (e).

20. The method according to claim 11 wherein the preform is wholly within the caliper body.

21. The method according to claim 11 wherein the preform has a generally uniform shape.

22. A brake caliper produced according to the method of claim 11.

23. A method for producing a composite brake caliper adapted for use in a vehicle brake assembly comprising the steps of:

(a) providing a molding apparatus having at least a pair of mold sections, at least one of the pair of mold sections including at least one projection extending from a surface thereof;

(b) providing at least one reinforced preformed formed from at least a first material, the preform having at least one opening formed at least partially therein;

(d) positioning the preform in the molding apparatus with the projection of the mold section extending into the opening of the preform so as to orient the preform in a predetermined position within the molding apparatus; and (e) casting a caliper body formed from a second material in situ therewith to produce the composite brake caliper;

wherein the preform forms at least a portion of an outer surface of the caliper body.

24. The method according to claim 23 wherein in step (d) the preform in positioned in the molding apparatus in the predetermined position so as to be in a bridge portion of the composite brake caliper which is formed during step (e).

25. The method according to claim 24 wherein the preform extends across an entire axial width of the bridge portion of the composite brake caliper extending from an outboard leg to an inboard leg thereof.

26. The method according to claim 24 wherein the preform is in an underside of the bridge portion of the composite caliper.

27. The method according to claim 23 wherein the preform is formed from a powdered metal material.

28. The method according to claim 23 wherein the preform is formed from a first material and is reinforced with a second material.

29. The method according to claim 23 wherein the caliper body is formed from a material selected from the group consisting of aluminum or alloys thereof, nodular iron, or a combination of two different metals.

30. The method according to claim 23 wherein in step (b) two preforms are provided and in step (d) the two preforms are positioned in the molding apparatus in the predetermined positions so as to be near opposed sides of a bridge portion of the composite caliper which is formed during step (e).

31. The method according to claim 23 wherein the preform has a generally uniform shape.

32. The method according to claim 23 wherein the preform is a unitary composite preform including a first portion reinforced with a first material and second portion reinforced with a second material.

33. A brake caliper produced according to the method of claim 23.

34. A composite brake caliper produced by a casting process utilizing a molding apparatus having at least a pair of mold sections, at least one of the pair of mold sections including at least one projection extending from a surface thereof, the composite brake caliper comprising:

at least one reinforced preform formed from at least a first material, said preform having at least one opening formed at least partially therein; and a caliper body formed from a second material and cast in situ with said preform during the casting process, said caliper body including an inboard leg and an outboard leg interconnected by an intermediate bridge portion;

wherein said preform is oriented in a predetermined position in said caliper body by positioning the projection of the mold section into said opening of said preform so as to orient said preform in said predetermined position in said caliper body subsequent to the casting process, and wherein said preform is formed from chopped alumina oxide fibers and is reinforced with a material selected from the group consisting of individual strands of ceramic fibers and chopped ceramic fibers.

35. The composite brake caliper according to claim 34 wherein two preforms are provided and positioned in the molding apparatus in the predetermined positions so as to be near opposed sides of said bridge portion of said composite caliper.

36. The composite brake caliper according to claim 35 wherein said two preforms are oriented at an angle with respect to an axis of said composite caliper.

37. The composite brake caliper according to claim 21 wherein said caliper body is formed from a material selected from the group consisting of aluminum or alloys thereof, nodular iron, or a combination of two different metals.

38. The composite brake caliper according to claim 34 wherein said preform extends across an entire axial width of said bridge portion of said composite brake caliper.

39. The composite brake caliper according to claim 34 wherein said preform is in an underside of said bridge portion of said composite caliper.

40. The composite brake caliper according to claim 34 wherein said preform is wholly within said caliper body.

41. The composite brake caliper according to claim 34 wherein said preform has a generally uniform shape.

42. A composite brake caliper produced by a casting process utilizing a molding apparatus having at least a pair of mold sections, at least one of the pair of mold sections including at least one projection extending from a surface thereof, the composite brake caliper comprising:

at least one reinforced preform formed from at least a first material, said preform having at least one opening formed at least partially therein; and a caliper body formed from a second material and cast in situ with said preform during the casting process, said caliper body including an inboard leg and an outboard leg interconnected by an intermediate bridge portion;

wherein said preform is oriented in a predetermined position in said caliper body by positioning the projection of the mold section into said opening of said preform so as to orient said preform in said predetermined position in said caliper body subsequent to the casting process and wherein said preform forms at least a portion of an outer surface of said caliper body.

43. The composite brake caliper according to claim 42 wherein two preforms are provided and positioned in the molding apparatus in the predetermined positions so as to be near opposed sides of said bridge portion of said composite caliper.

44. The composite brake caliper according to claim 43 wherein said two preforms are oriented at an angle with respect to an axis of said composite caliper.

45. The composite brake caliper according to claim 42 wherein said preform is formed from a powdered metal material.

46. The composite brake caliper according to claim 42 wherein said preform is a unitary composite perform including a first portion reinforced with a first material and second portion reinforced with a second material.

47. The composite brake caliper according to claim 42 wherein said preform is formed from a first material and is reinforced with a second material.

48. The composite brake caliper according to claim 42 wherein said caliper body is formed from a material selected from the group consisting of aluminum or alloys thereof, nodular iron, or a combination of two different metals.

49. The composite brake caliper according to claim 42 wherein said preform extends across an entire axial width of said bridge portion of said composite brake caliper.

50. The composite brake caliper according to claim 42 wherein said preform is in an underside of said bridge portion of said composite caliper.

51. The composite brake caliper according to claim 42 wherein said preform is wholly within said caliper body.

52. The composite brake caliper according to claim 42 wherein said preform has a generally uniform shape.

* * * * *